US011347080B2

(12) United States Patent
Lim et al.

(10) Patent No.: US 11,347,080 B2
(45) **Date of Patent: *May 31, 2022**

(54) LIGHT MODULATION DEVICE

(71) Applicant: LG Chem, Ltd., Seoul (KR)

(72) Inventors: Eun Jung Lim, Daejeon (KR); Nam Hun Kim, Daejeon (KR); Jung Sun You, Daejeon (KR); Jin Hong Kim, Daejeon (KR); Hyun Jun Lee, Daejeon (KR); Min Jun Gim, Daejeon (KR); Kyung Ki Hong, Daejeon (KR); In Ju Mun, Daejeon (KR); Dong Hyun Oh, Daejeon (KR)

(73) Assignee: LG Chem, Ltd.

( * ) Notice: Subject to any disclaimer, the term of this patent is extended or adjusted under 35 U.S.C. 154(b) by 114 days.

This patent is subject to a terminal disclaimer.

(21) Appl. No.: 16/500,248

(22) PCT Filed: Apr. 30, 2018

(86) PCT No.: PCT/KR2018/005021

§ 371 (c)(1),
(2) Date: Oct. 2, 2019

(87) PCT Pub. No.: WO2018/199720

PCT Pub. Date: Nov. 1, 2018

(65) Prior Publication Data

US 2020/0319494 A1 Oct. 8, 2020

(30) Foreign Application Priority Data

Apr. 28, 2017 (KR) ........................ 10-2017-0054964
Jan. 11, 2018 (KR) ........................ 10-2018-0003783
(Continued)

(51) Int. Cl.
*G02F 1/1333* (2006.01)
*G02F 1/137* (2006.01)
(Continued)

(52) U.S. Cl.
CPC .............. *G02C 7/101* (2013.01); *B32B 7/035* (2019.01); *G02F 1/0126* (2013.01);
(Continued)

(58) Field of Classification Search
CPC . G02F 1/0126; G02F 1/133528; G02F 1/1326
See application file for complete search history.

(56) References Cited

U.S. PATENT DOCUMENTS 4,396,250 A 8/1983 Wada et al.
4,505,546 A 3/1985 Umeda et al.
(Continued)

FOREIGN PATENT DOCUMENTS

CN 1218738 A 6/1999
CN 1768294 A 5/2006
(Continued)

OTHER PUBLICATIONS

Extended European Search Report including the Written Opinion for Application No. EP 18790144.2 dated Jan. 24, 2020, 9 pages.
(Continued)

*Primary Examiner* — Mariam Qureshi
(74) *Attorney, Agent, or Firm* — Lerner, David, Littenberg, Krumholz & Mentlik, LLP

(57) ABSTRACT

The present application relates to a light modulating device and an eyewear. The present application can provide a light modulation device having both excellent mechanical properties and optical properties by applying a polymer film that is also optically anisotropic and mechanically anisotropic to a substrate.

17 Claims, 5 Drawing Sheets

11

12

13

(30) Foreign Application Priority Data

Jan. 11, 2018 (KR) ........................ 10-2018-0003784
Jan. 11, 2018 (KR) ........................ 10-2018-0003785
Jan. 11, 2018 (KR) ........................ 10-2018-0003786
Jan. 11, 2018 (KR) ........................ 10-2018-0003787
Jan. 11, 2018 (KR) ........................ 10-2018-0003788
Jan. 11, 2018 (KR) ........................ 10-2018-0003789
Jan. 12, 2018 (KR) ........................ 10-2018-0004305

(51) Int. Cl.
*G02C 7/10* (2006.01)
*G02F 1/13363* (2006.01)
*G02F 1/139* (2006.01)
*B32B 7/035* (2019.01)
*G02F 1/01* (2006.01)
*G02F 1/1343* (2006.01)
*G02F 1/1347* (2006.01)
*G02B 27/01* (2006.01)
*G02F 1/13* (2006.01)
*G02F 1/1335* (2006.01)

(52) U.S. Cl.
CPC ........ *G02F 1/1396* (2013.01); *G02F 1/13363* (2013.01); *G02F 1/13475* (2013.01); *G02F 1/13725* (2013.01); *G02F 1/13737* (2013.01); *G02F 1/133305* (2013.01); *G02F 1/133631* (2021.01); *G02F 1/134309* (2013.01); *G02B 27/0172* (2013.01); *G02B 27/0176* (2013.01); *G02B 2027/0178* (2013.01); *G02C 2202/16* (2013.01); *G02F 1/1326* (2013.01); *G02F 1/1347* (2013.01); *G02F 1/13439* (2013.01); *G02F 1/133365* (2013.01); *G02F 1/133528* (2013.01); *G02F 1/133536* (2013.01); *G02F 1/133553* (2013.01); *G02F 1/133635* (2021.01); *G02F 2202/04* (2013.01); *G02F 2413/01* (2013.01)

(56) References Cited

U.S. PATENT DOCUMENTS 4,533,214 A * 8/1985 Penz ................. G02F 1/133528 349/102
4,586,790 A * 5/1986 Umeda ............... G02F 1/13363 349/102
4,707,079 A 11/1987 Inoue
5,067,795 A 11/1991 Senatore
5,608,567 A * 3/1997 Grupp ..................... A61F 9/067 349/104
5,798,809 A 8/1998 Nakamura et al.
6,197,430 B1 3/2001 Asakura et al.
6,562,274 B1 5/2003 Asakura et al.
9,158,143 B2 10/2015 Chen et al.
9,254,789 B2 2/2016 Anderson et al.
2002/0093620 A1 7/2002 Itou et al.
2005/0068480 A1 3/2005 Hiyama et al.
2006/0105117 A1 5/2006 Kim et al.
2007/0035682 A1 2/2007 Ito et al.
2007/0132925 A1 6/2007 Nakayama
2007/0182885 A1 8/2007 Egi et al.
2007/0207298 A1 9/2007 Suzuki et al.
2007/0213861 A1 9/2007 Takeichi
2008/0218671 A1 9/2008 Nakamura
2008/0254237 A1 10/2008 Omatsu et al.
2008/0266500 A1 10/2008 Nimura
2009/0214869 A1 8/2009 Hatano et al.
2009/0237599 A1 9/2009 Nagai
2009/0284689 A1 11/2009 Ikeda et al.
2010/0182544 A1 7/2010 Ikeda et al.
2010/0231830 A1 9/2010 Hirakata et al.
2011/0103036 A1 5/2011 Bosl et al.
2012/0251739 A1* 10/2012 Kato ........................ G02B 1/04 428/1.33
2013/0093982 A1 4/2013 Kuroda et al.
2013/0107176 A1 5/2013 Van Oosten
2014/0168767 A1 6/2014 Shin et al.
2014/0232983 A1 8/2014 Tokumaru et al.
2014/0347613 A1 11/2014 Kim et al.
2014/0354923 A1 12/2014 Lee et al.
2015/0002010 A1 1/2015 Lee et al.
2015/0177435 A1 6/2015 Kim et al.
2015/0205143 A1 7/2015 Chae et al.
2015/0378189 A1* 12/2015 Kim ..................... G02F 1/1334 349/86
2016/0017226 A1 1/2016 Fujisawa et al.
2016/0026022 A1 1/2016 Jung et al.
2016/0062012 A1* 3/2016 Shin ..................... G02B 5/3033 428/1.31
2016/0131945 A1 5/2016 Woo
2016/0146980 A1 5/2016 Shin et al.
2016/0154159 A1 6/2016 Kim et al.
2016/0187554 A1 6/2016 Lee et al.
2016/0245972 A1 8/2016 Yamanaka et al.
2017/0108632 A1 4/2017 Yu et al.
2017/0115516 A1 4/2017 Won et al.
2017/0190972 A1 7/2017 Kuriyama et al.
2018/0120652 A1 5/2018 Lan et al.
2018/0129086 A1 5/2018 Ohtake et al.
2018/0194121 A1 7/2018 Yang et al.
2018/0284536 A1 10/2018 Lee et al.
2019/0049641 A1 2/2019 Oh et al.
2020/0081300 A1* 3/2020 Heo .......................... C08J 5/18
2020/0160578 A1 5/2020 Jones et al.

FOREIGN PATENT DOCUMENTS

CN 1946776 A 4/2007
CN 101014885 A 8/2007
CN 101029937 A 9/2007
CN 101361021 A 2/2009
CN 102289105 A 12/2011
CN 103733119 A 4/2014
CN 103869401 A 6/2014
CN 103959149 A 7/2014
CN 104181727 A 12/2014
CN 105408781 A 3/2016
CN 105629367 A 6/2016
CN 105659122 A 6/2016
EP 0022311 A1 1/1981
EP 2848979 A2 3/2015
EP 2857870 A1 4/2015
JP S54148548 A 11/1979
JP S5887538 A 5/1983
JP S5893032 A 6/1983
JP S58112376 A 7/1983
JP S58143305 A 8/1983
JP S59224826 A 12/1984
JP 56021720 U 2/1985
JP S60254023 A 12/1985
JP H0519249 A 1/1993
JP H0695065 A 4/1994
JP H06222350 A 8/1994
JP H6273746 A 9/1994
JP H1062776 A 3/1998
JP H10239668 A 9/1998
JP 2000029002 A 1/2000
JP 2001305526 A 10/2001
JP 2004109786 A 4/2004
JP 2004354750 12/2004
JP 3658122 B2 6/2005
JP 2005173584 A 6/2005
JP 2007163852 A 6/2007
JP 2008242041 A 10/2008
JP 2009282063 A 12/2009
JP 2010002664 A 1/2010
JP 201397279 A 5/2013
JP 2014170202 A 9/2014
JP 5614506 B2 10/2014
JP 2014232320 A 12/2014
JP 2016095492 A 5/2016

(56) References Cited

FOREIGN PATENT DOCUMENTS

| | | | |
|---|---|---|---|
| JP | 2016161807 | A | 9/2016 |
| JP | 2016191870 | A | 11/2016 |
| JP | 2017167267 | A | 9/2017 |
| KR | 19980018011 | A | 6/1998 |
| KR | 20020061150 | A | 7/2002 |
| KR | 20050031940 | A | 4/2005 |
| KR | 20050090711 | A | 9/2005 |
| KR | 20070089635 | A | 8/2007 |
| KR | 20080022525 | A | 3/2008 |
| KR | 20080073252 | A | 8/2008 |
| KR | 20080079564 | A | 9/2008 |
| KR | 20080092466 | A | 10/2008 |
| KR | 20110101854 | A | 9/2011 |
| KR | 20120072177 | A | 7/2012 |
| KR | 20120089200 | A | 8/2012 |
| KR | 20130067877 | A | 6/2013 |
| KR | 101408387 | B1 | 6/2014 |
| KR | 20140072032 | A | 6/2014 |
| KR | 101426577 | B1 | 8/2014 |
| KR | 20140098310 | A | 8/2014 |
| KR | 20150002354 | A | 1/2015 |
| KR | 20150037650 | A | 4/2015 |
| KR | 20150138680 | A | 12/2015 |
| KR | 20160002350 | A | 1/2016 |
| KR | 20160016428 | A | 2/2016 |
| KR | 20160065552 | A | 6/2016 |
| KR | 20160088741 | A | 7/2016 |
| KR | 20160107706 | A | 9/2016 |
| KR | 20160115428 | A | 10/2016 |
| KR | 20170003266 | A | 1/2017 |
| KR | 20170004257 | A | 1/2017 |
| KR | 20170047972 | A | 5/2017 |
| KR | 20170081740 | A | 7/2017 |
| KR | 20170082252 | A | 7/2017 |
| KR | 20170090236 | A | 8/2017 |
| KR | 20170101157 | A | 9/2017 |
| KR | 20170101158 | A | 9/2017 |
| TW | 201022016 | A | 6/2010 |
| TW | I559059 | B | 11/2016 |
| WO | 2009123949 | A1 | 10/2009 |
| WO | 201380948 | A1 | 6/2013 |
| WO | 2016158814 | A1 | 10/2016 |
| WO | 2017041167 | A1 | 3/2017 |
| WO | 2017179940 | A1 | 10/2017 |

OTHER PUBLICATIONS

Extended European Search Report including Written Opinion for Application No. EP18791578 dated Jan. 28, 2020, 10 pages.

International Search Report from Application No. PCT/KR2018/005018 dated Aug. 14, 2018, 2 pages.

International Search Report from Application No. PCT/KR2018/005021 dated Aug. 16, 2018, 2 pages.

International Search Report from Application No. PCT/KR2018/005016 dated Aug. 10, 2018, 2 pages.

Search report from Notice of Allowance from Taiwan Application No. 107114707 completed Mar. 28, 2019.

Gim et al., “Light Modulation Device”, U.S. Appl. No. 16/607,520, filed Oct. 23, 2019.

Gim et al., “Light Modulation Device,” U.S. Appl. No. 16/607,623, filed Oct. 23, 2019.

Gim et al., “Light Modulation Device,” U.S. Appl. No. 16/607,904, filed Oct. 24, 2019.

Gim et al., “Light Modulation Device,” U.S. Appl. No. 16/608,007, filed Oct. 24, 2019.

Lee et al., “Light Modulation Device,” U.S. Appl. No. 16/480,497, filed Jul. 24, 2019.

Search report from International Application No. PCT/KR2018/005017, dated Aug. 7, 2018.

Search Report from International Application No. PCT/KR2018/005020, dated Aug. 30, 2018.

Search report from International Application No. PCT/KR2018/005023, dated Aug. 16, 2018.

Chinese Search Report for Application No. 201880027094.8, dated Aug. 23, 2021, 4 pages.

Chinese Search Report for Application No. 201880027762.7, dated Sep. 24, 2021, 3 pages.

Chinese Search Report for Application No. 201880027679, dated Sep. 24, 2021, 3 pages.

Chinese Search Report for Application No. 201880027804.7, dated Oct. 19, 2021, 3 pages.

Chinese Search Report for Application No. 201880027805.1, dated Aug. 19, 2021, 3 pages.

Chinese Search Report for Application No. 201880027823, dated Aug. 19, 2021, 3 pages.

* cited by examiner

[Figure 1]

| 11 |
| --- |
| 12 |
| 13 |

[Figure 2]

| 11 |
| --- |
| 12 |
| 13 |
| 14 |

[Figure 3]

| 21 |
| --- |
| 22 |
| 23 |
| 24 |
| 25 |

[Figure 4]

| 31 |
| --- |
| 32 |
| 33 |
| 34 |
| 35 |
| 36 |

[Figure 5]
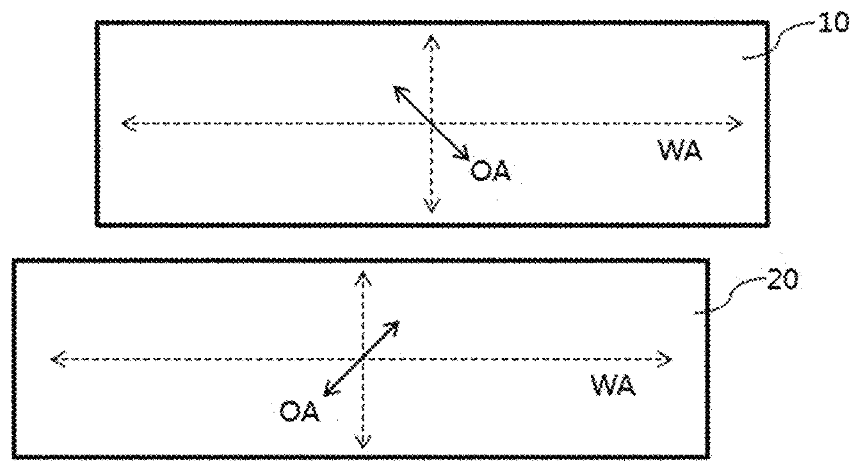

[Figure 6]
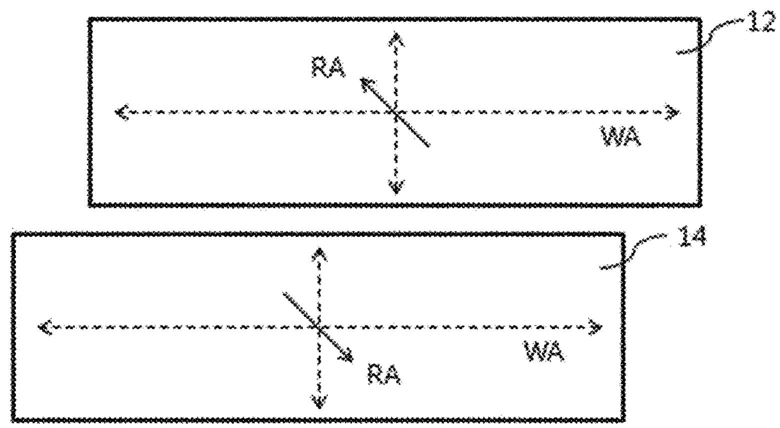
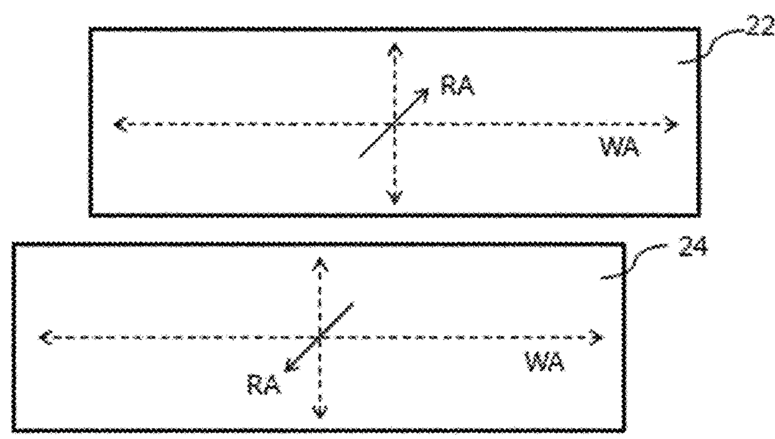
[Figure 7]
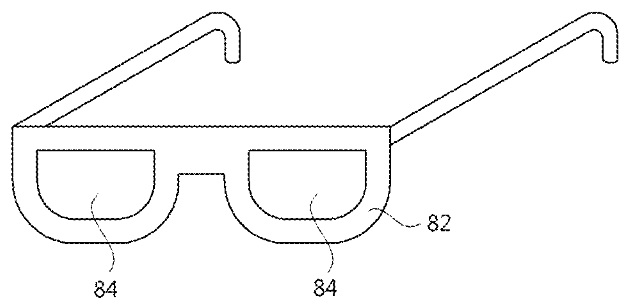

[Figure 8]
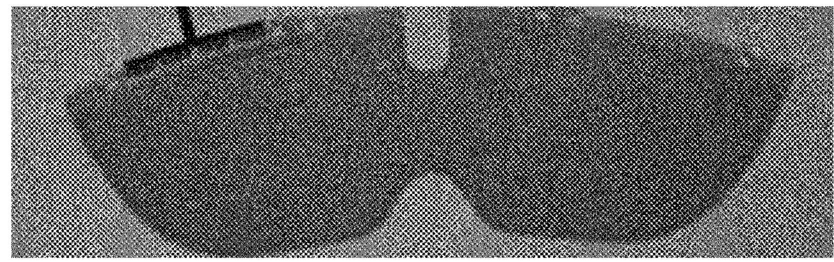
[Figure 9]
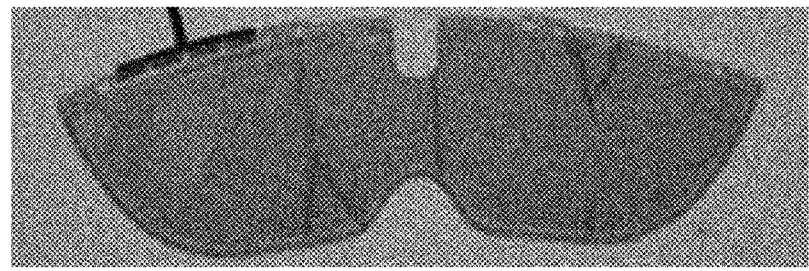
[Figure 10]
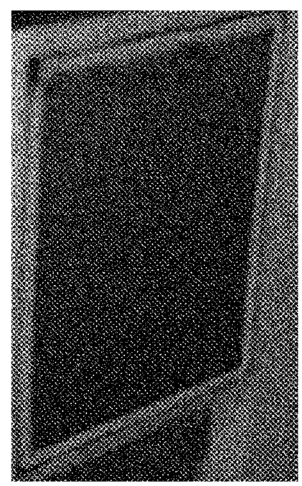

[Figure 11]
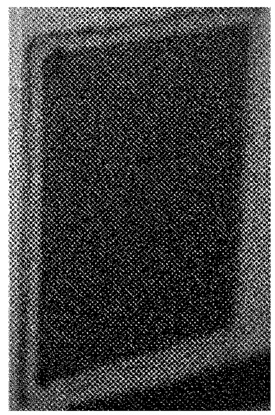
[Figure 12]
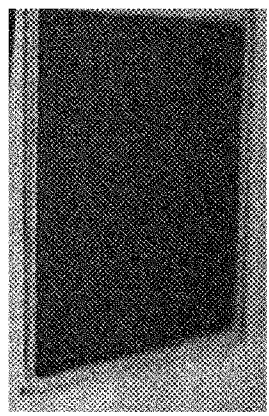

LIGHT MODULATION DEVICE

CROSS-REFERENCE TO RELATED APPLICATIONS

The present application is a national phase entry under 35 U.S.C. § 371 of International Application No. PCT/KR2018/005021 filed Apr. 30, 2018, which claims priority from Korean Patent Application No. 10-2017-0054964 filed on Apr. 28, 2017, and Korean Patent Application Nos. 10-2018-0003783, 10-2018-0003784, 10-2018-0003785, 10-2018-0003786, 10-2018-0003787, 10-2018-0003788 and 10-2018-0003789 filed on Jan. 11, 2018, and Korean Patent Application No. 10-2018-0004305 filed on Jan. 12, 2018, the disclosures of which is incorporated herein by reference in its entirety.

TECHNICAL FIELD

This application relates to a light modulation device.

BACKGROUND ART

A light modulation device, in which a light modulation layer including a liquid crystal compound or the like is positioned between two substrates facing each other, has been used for various applications.

For example, in Patent Document 1 (EP Patent Application Publication No. 0022311), a variable transmittance device using a so-called GH cell (guest host cell), in which a mixture of a liquid crystal host material and a dichroic dye guest is applied, as a light modulation layer has been known.

In such a device, a glass substrate having excellent optical isotropy and good dimensional stability has mainly been used as the substrate.

There is an attempt to apply a polymer film substrate instead of a glass substrate as a substrate of the light modulation device, while the application of the light modulation device is extended to eyewear or a smart window such as a sunroof without being limited to the display device and the shape of the device is not limited to a plane, but various designs such as a folding form are applied thereto, with showing the necessity of a so-called flexible device or the like.

In the case of applying the polymer film substrate, it is known that it is advantageous to apply a film substrate which is as optically isotropic as possible and has a small difference in physical properties in so-called MD (machine direction) and TD (transverse direction) directions in order to secure characteristics similar to those of a glass substrate.

DISCLOSURE

Technical Problem

The present application relates to a light modulation device. It is an object of the present application to provide a light modulation device which is excellent in both mechanical properties and optical properties by applying an optically and mechanically anisotropic polymer film as a substrate.

Technical Solution

In this specification, the term such as vertical, horizontal, orthogonal or parallel among terms defining an angle means substantially vertical, horizontal, orthogonal or parallel in the range without impairing intended effects, and the range of vertical, horizontal, orthogonal or parallel includes an error such as a production error or a deviation (variation). For example, each case of the foregoing may include an error within about ±15 degrees, an error within about ±10 degrees or an error within about ±5 degrees.

Among physical properties mentioned herein, when the measured temperature affects relevant physical properties, the physical properties are physical properties measured at room temperature, unless otherwise specified.

In this specification, the term room temperature is a temperature in a state without particularly warming or cooling, which may mean one temperature in a range of about 10° C. to 30° C., for example, a temperature of about 15° C. or higher, 18° C. or higher, 20° C. or higher, or about 23° C. or higher, and about 27° C. or lower. Unless otherwise specified, the unit of the temperature mentioned herein is ° C.

The phase difference and the refractive index mentioned herein mean a refractive index for light having a wavelength of about 550 nm, unless otherwise specified.

Unless otherwise specified, the angle formed by any two directions, which is mentioned herein, may be an acute angle of acute angles to obtuse angles formed by the two directions, or may be a small angle from angles measured in clockwise and counterclockwise directions. Thus, unless otherwise specified, the angles mentioned herein are positive. However, in order to display the measurement direction between the angles measured in the clockwise direction or the counterclockwise direction if necessary, any one of the angle measured in the clockwise direction and the angle measured in the counterclockwise direction may be represented as a positive number, and the other angle may be represented as a negative number.

The liquid crystal compound included in the active liquid crystal layer or the light modulation layer herein may also be referred to as liquid crystal molecules, a liquid crystal host (when included with the dichroic dye guest), or simply liquid crystals.

The present application relates to a light modulation device. The term light modulation device may mean a device capable of switching between at least two or more different light states. Here, the different light states may mean states in which at least the transmittance and/or the reflectance are different.

An example of the state that the light modulation device can implement includes transmission, blocking, high reflection and/or low reflection mode states.

In one example, the light modulation device, at least, may be a device capable of switching between the transmission and blocking mode states, or may be a device capable of switching between the high reflection and low reflection mode states.

The transmittance of the light modulation device in the transmission mode may be at least 20% or more, 25% or more, 30% or more, 35% or more, 40% or more, 45% or more, 50% or more, 55% or more, 60% or more, 65% or more, 70% or more, 75% or more, or 80% or more or so. Also, the transmittance of the light modulation device in the blocking mode may be 60% or less, 55% or less, 50% or less, 45% or less, 40% or less, 35% or less, 30% or less, 25% or less, 20% or less, 15% or less, 10% or less, or 5% or less. Since the higher the transmittance in the transmission mode state is, the more advantageous it is and the lower the transmittance in the blocking mode state is, the more advantageous it is, the upper limit of the transmittance in the transmission mode state and the lower limit of the transmittance in the blocking mode state are not particularly limited, where in one example, the upper limit of the transmittance in the transmission mode state may be about 100% and the lower limit of the transmittance in the blocking mode state may be about 0%.

On the other hand, in one example, in the light modulation device capable of switching between the transmission mode state and the blocking mode state, the difference between the transmittance in the transmission mode state and the transmittance in the blocking mode state (transmission mode–blocking mode) may be 15% or more, 20% or more, 25% or more, 30% or more, 35% or more, or 40% or more, or may be 90% or less, 85% or less, 80% or less, 75% or less, 70% or less, 65% or less, 60% or less, 55% or less, 50% or less, or 45% or less.

The above-mentioned transmittance may be, for example, linear light transmittance. The linear light transmittance is a percentage of the ratio of the light transmitted in the same direction as the incident direction to the light incident on the device. For example, if the device is in the form of a film or sheet, the percentage of the light transmitted through the device in the direction parallel to the normal direction among the light incident in a direction parallel to the normal direction of the film or sheet surface may be defined as the transmittance.

The reflectance of the light modulation device in the high reflection mode state may be at least 10% or more, 15% or more, 20% or more, 25% or more, 30% or more, 35% or more, or 40% or more. Also, the reflectance of the light modulation device in the low reflection mode state may be 20% or less, 15% or less, 10% or less, or 5% or less. Since the higher the reflectance in the high reflectance mode is, the more advantageous it is and the lower the reflectance in the low reflectance mode is, the more advantageous it is, the upper limit of the reflectance in the high reflection mode state and the lower limit of the reflectance in the low reflection mode state are not particularly limited, where in one example, the reflectance in the high reflection mode state may be about 60% or less, 55% or less, or 50% or less, and the lower limit of the reflectance in the low reflection mode state may be about 0%.

Besides, in one example, in the light modulation device capable of switching between the low reflection mode state and the high reflection mode state, the difference between the reflectance in the high reflection mode state and the reflectance in the low reflection mode state (high reflection mode–low reflection mode) may be 5% or more, 10% or more, 15% or more, 20% or more, 25% or more, 30% or more, 35% or more, or 40% or more, or may be 90% or less, 85% or less, 80% or less, 75% or less, 70% or less, 65% or less, 60% or less, 55% or less, 50% or less, or 45% or less.

The above-mentioned transmittance and reflectance may be each transmittance or reflectance for any one wavelength in the visible light region, for example, any one wavelength in a range of about 400 to 700 nm or about 380 to 780 nm, or transmittance or reflectance for the entire visible light region, maximum or minimum transmittance or reflectance among the transmittance or reflectance for the entire visible light region, or an average value of the transmittance or an average value of the reflectance in the visible region.

The light modulation device of the present application may be designed to switch between at least two or more states of any one state selected from the transmission mode, the blocking mode, the high reflection mode and the low reflection mode, and another state. If necessary, other states other than the above states, for example, other third states or further states including an intermediate transmittance state in the transmission mode and blocking mode states, an intermediate reflectance state in the high reflection mode and low reflection mode states, or the like can also be implemented.

The switching of the light modulation device may be controlled depending on whether or not an external signal, for example, a voltage signal is applied. For example, in a state of not applying an external signal such as a voltage, the light modulation device may maintain any one of the above-described states, and then may be switched to another state when a voltage is applied. The state of the mode may be changed or the third different mode state may also be implemented, by changing the intensity, frequency and/or shape of the applied voltage.

The light modulation device of the present application may basically comprise a light modulation film layer having two substrates disposed opposite to each other and a light modulation layer positioned between the substrates. Hereinafter, for convenience, any one of the two substrates disposed opposite to each other will be referred to as a first substrate, and the other substrate will be referred to as a second substrate.

FIG. 1 is a cross-sectional diagram of an exemplary light modulation film layer of the present application, where the light modulation film layer may comprise first and second polymer film substrates (11, 13), and a light modulation layer (12) present between the first and second polymer film substrates.

In the light modulation device of the present application, a polymer film substrate is applied as the substrate. The substrate of the light modulation device may not comprise a glass layer. The present application can constitute a device having no optical defect such as a so-called rainbow phenomenon but excellent mechanical properties, by disposing polymer film substrates having optically large anisotropy and also anisotropy even in terms of mechanical properties in a specific relationship. Such a result is contrary to the common sense of the prior art that optically isotropic substrates must be applied in order to secure excellent optical properties and substrates having isotropic mechanical properties are advantageous in terms of mechanical properties such as dimensional stability of the device.

In this specification, the polymer film substrate having anisotropy in terms of optical and mechanical properties may be referred to as an asymmetric substrate or an asymmetric polymer film substrate. Here, the fact that the polymer film substrate is optically anisotropic is the case of having the above-described in-plane retardation, and the fact that it is anisotropic in terms of mechanical properties is the case of having physical properties to be described below.

Hereinafter, physical properties of the polymer film substrate mentioned herein may be physical properties of the polymer film substrate itself, or physical properties in a state where an electrode layer is formed on one side of the polymer film substrate. In this case, the electrode layer may be an electrode layer formed in a state where the polymer film substrate is included in the optical device.

Measurement of physical properties of each polymer film substrate mentioned herein is performed according to the method described in the example section of this specification.

In one example, the in-plane retardation of the first and second polymer film substrates may be about 4,000 nm or more, respectively.

In this specification, the in-plane retardation (Rin) may mean a value calculated by Equation 1 below.

$$Rin = d \times (nx - ny) \quad \text{[Equation 1]}$$

In Equation 1, Rin is in-plane retardation, d is a thickness of the polymer film substrate, nx is a refractive index in the slow axis direction of the polymer film substrate, ny is a refractive index in the fast axis direction, which is the refractive index of the in-plane direction perpendicular to the slow axis direction.

The in-plane retardation of each of the first and second polymer film substrates may be 4,000 nm or more, 5,000 nm or more, 6,000 nm or more, 7,000 nm or more, 8,000 nm or more, 9,000 m or more, 10,000 m or more, 11,000 m or more, 12,000 m or more, 13,000 m or more, 14,000 m or more, or 15,000 m or more or so. The in-plane retardation of each of the first and second polymer film substrates may be about 50,000 nm or less, about 40,000 nm or less, about 30,000 nm or less, 20,000 nm or less, 18,000 nm or less, 16,000 nm or less, 15,000 nm or less, or 12,000 nm or less or so.

As a polymer film having large retardation as above, a film known as a so-called high-stretched PET (poly(ethylene terephthalate)) film or SRF (super retardation film), and the like is typically known. Therefore, in the present application, the polymer film substrate may be, for example, a polyester film substrate.

The film having extremely high retardation as above is known in the art, and such a film exhibits high asymmetry even in mechanical properties by high stretching or the like during preparation procedures as well as optically large anisotropy. A representative example of the polymer film substrate in a state known in the art is a polyester film such as a PET (poly(ethylene terephthalate)) film, and for example, there are films of the trade name SRF (super retardation film) series supplied by Toyobo Co., Ltd.

In one example, in each of the polymer film substrates, a ratio (E1/E2) of an elongation (E1) in any first direction in the plane to an elongation (E2) in a second direction perpendicular to the first direction may be 3 or more. In another example, the ratio (E1/E2) may be about 3.5 or more, 4 or more, 4.5 or more, 5 or more, 5.5 or more, 6 or more, or 6.5 or more. In another example, the ratio (E1/E2) may be about 20 or less, 18 or less, 16 or less, 14 or less, 12 or less, 10 or less, 8 or less, or 7.5 or less.

As used herein, the terms "first direction," "second direction" and "third direction" of the polymer film substrate are each any in-plane direction of the film substrate. For example, when the polymer film substrate is a stretched polymer film substrate, the in-plane direction may be an in-plane direction formed by MD (machine direction) and TD (transverse direction) directions of the polymer film substrate. In one example, the first direction described herein may be any one of the slow axis direction and the fast axis direction of the polymer film substrate, and the second direction may be the other of the slow axis direction and the fast axis direction. In another example, when the polymer film substrate is a stretched polymer film substrate, the first direction may be any one of MD (machine direction) and TD (transverse direction) directions, and the second direction may be the other of MD (machine direction) and TD (transverse direction) directions.

In one example, the first direction of the polymer film substrate mentioned herein may be the TD direction or the slow axis direction.

Here, each of the first and second polymer film substrates may have the elongation in the first direction (for example, the above-described slow axis direction or TD direction) of 15% or more, or 20% or more. In another example, the elongation may be about 25% or more, 30% or more, 35% or more, or 40% or more, or may be about 60% or less, 55% or less, 50% or less, or 45% or less.

In one example, in each of the first and second polymer film substrates, an elongation (E3) in a third direction forming an angle within a range of 40 degrees to 50 degrees or about 45 degrees with the first and second directions, respectively, is larger than the elongation (E1) in the first direction, where the ratio (E3/E2) of the elongation (E3) in the third direction to the elongation (E2) in the second direction may be 5 or more.

In another example, the ratio (E3/E2) may be 5.5 or more, 6 or more, 6.5 or more, 7 or more, 7.5 or more, 8 or more, or 8.5 or more, and may be about 20 or less, 18 or less, 16 or less, 14 or less, 12 or less, or 10 or less.

Each of the first and second polymer film substrates may have the elongation in the third direction of 30% or more. In another example, the elongation may be about 35% or more, 40% or more, 45% or more, 50% or more, or 55% or more, or may be about 80% or less, 75% or less, 70% or less, or 65% or less.

In each of the first and second polymer film substrates, a ratio (CTE2/CTE1) of a coefficient of thermal expansion (CTE2) in the second direction to a coefficient of thermal expansion (CTE1) in the first direction may be 1.5 or more. The coefficients of thermal expansion (CTE1, CTE2) are each a value confirmed within a temperature range of 40° C. to 80° C. In another example, the ratio (CTE2/CTE1) may be about 2 or more, about 2.5 or more, 3 or more, or 3.5 or more, or may be 10 or less, 9 or less, 8 or less, 7 or less, 6 or less, 5 or less, or 4 or less.

The coefficient of thermal expansion (CTE2) in the second direction may be in a range of 5 to 150 ppm/° C. The coefficient of thermal expansion may be about 10 ppm/° C. or more, 15 ppm/° C. or more, 20 ppm/° C. or more, 25 ppm/° C. or more, 30 ppm/° C. or more, 35 ppm/° C. or more, 40 ppm/° C. or more, 45 ppm/° C. or more, 50 ppm/° C. or more, 55 ppm/° C. or more, 60 ppm/° C. or more, 65 ppm/° C. or more, 70 ppm/° C. or more, 75 ppm/° C. or more, or 80 ppm/° C. or more, or may be 140 ppm/° C. or less, 130 ppm/° C. or less, 120 ppm/° C. or less, 100 ppm/° C. or less, 95 ppm/° C. or less, 90 ppm/° C. or less, 85 ppm/° C. or less, 80 ppm/° C. or less, 40 ppm/° C. or less, 30 ppm/° C. or less, or 25 ppm/° C. or less.

In each of the first and second polymer film substrates, a ratio (YM1/YM2) of an elastic modulus (YM1) in the first direction to an elastic modulus (YM2) in the second direction may be 1.5 or more. In another example, the ratio (YM1/YM2) may be about 2 or more, or may be 10 or less, 9 or less, 8 or less, 7 or less, 6 or less, 5 or less, 4 or less, 3 or less or 2.5 or less.

The elastic modulus (YM1) in the first direction may be in a range of about 2 to 10 GPa. In another example, the elastic modulus (YM1) may be about 2.5 GPa or more, 3 GPa or more, 3.5 GPa or more, 4 GPa or more, 4.5 GPa or more, 5 GPa or more, or 5.5 GPa or more, or may also be about 9.5 GPa or less, 9 GPa or less, 8.5 GPa or less, 8 GPa or less, 7.5 GPa or less, 7 GPa or less, 6.5 GPa or less, or 6 GPa or less.

The elastic modulus is a so-called Young's modulus, which is measured according to the method of the example described below.

In each of the first and second polymer film substrates, a ratio (MS1/MS2) of a maximum stress (MS1) in the first direction to a maximum stress (MS2) in the second direction may be 1.5 or more. In another example, the ratio (MS1/

MS2) may be about 2 or more, or may be 10 or less, 9 or less, 8 or less, 7 or less, 6 or less, 5 or less, 4 or less, 3 or less, or 2.5 or less.

The maximum stress (MS1) in the first direction (for example, the above-described slow axis direction or TD direction) may be in a range of about 80 to 300 MPa. In another example, the maximum stress (MS1) may be about 90 MPa or more, about 100 MPa or more, about 110 MPa or more, about 120 MPa or more, about 130 MPa or more, about 140 MPa or more, about 150 MPa or more, about 155 MPa or more, 160 MPa or more, 165 MPa or more, 170 MPa or more, 175 MPa or more, or 180 MPa or more, or may also be about 300 MPa or less, about 290 MPa or less, about 280 MPa or less, about 270 MPa or less, about 260 MPa or less, about 250 MPa or less, about 245 MPa or less, 240 MPa or less, 235 MPa or less, 230 MPa or less, 225 MPa or less, 220 MPa or less, 215 MPa or less, 210 MPa or less, 205 MPa or less, 200 MPa or less, 195 MPa or less, or 190 MPa or less.

In the light modulation device of the present application, an absolute value of the angle formed by the first direction of the first polymer film substrate and the first direction of the second polymer film substrate may be in a range of 0 degrees to 10 degrees or 0 degrees to 5 degrees, or the first directions may be approximately horizontal to each other. The first direction may be the slow axis direction or the TD direction of the polymer film substrate as described above.

As the device is configured by disposing polymer film substrates having asymmetric optical and mechanical properties so as to have such a specific relationship as described above, the present application can realize excellent optical and mechanical properties.

Although the reason why such an effect is realized is not clear, it is assumed that it is because a better balance of optical and mechanical properties is secured by controlling the large asymmetry, in which at least two polymer film substrates have, similarly and again disposing both asymmetry to be symmetric based on a specific axis, as compared with application of a film having an isotropic structure.

As described above, a representative example of the polymer film having large optical and mechanical asymmetry as above is a stretched PET (polyethyleneterephtalate) film known as a so-called high stretched polyester film or the like, and such a film is easily available in the industry.

Usually, the stretched PET film is a uniaxially stretched film of one or more layers produced by forming a PET-based resin into a film with melting/extruding, and stretching it or a biaxially stretched film of one or more layers produced by longitudinally and transversely stretching it after film formation.

The PET-based resin generally means a resin in which 80 mol % or more of the repeating units are ethylene terephthalate, which may also contain other dicarboxylic acid components and diol components. Other dicarboxylic acid components are not particularly limited, but may include, for example, isophthalic acid, p-beta-oxyethoxybenzoic acid, 4,4'-dicarboxydiphenyl, 4,4'-dicarboxybenzophenone, bis (4-carboxyphenyl)ethane, adipic acid, sebacic acid and/or 1,4-dicarboxycyclohexane, and the like.

Other diol components are not particularly limited, but may include propylene glycol, butanediol, neopentyl glycol, diethylene glycol, cyclohexanediol, ethylene oxide adducts of bisphenol A, polyethylene glycol, polypropylene glycol and/or polytetramethylene glycol, and the like.

The dicarboxylic acid component or the diol component may be used in combination of two or more as necessary. Furthermore, an oxycarboxylic acid such as p-oxybenzoic acid may also be used in combination. In addition, as other copolymerization components, a dicarboxylic acid component containing a small amount of amide bonds, urethane bonds, ether bonds and carbonate bonds, and the like, or a diol component may also be used.

As a production method of the PET-based resin, a method of directly polycondensing terephthalic acid, ethylene glycol and/or, as necessary, other dicarboxylic acids or other diols, a method of transesterifying dialkyl ester of terephthalic acid and ethylene glycol and/or, as necessary, dialkyl esters of other dicarboxylic acids or other diols and then polycondensing them, and a method of polycondensing terephtalic acid and/or, as necessary, ethylene glycol esters of other dicarboxylic acids and/or, as necessary, other diolesters, and the like are adopted.

For each polymerization reaction, a polymerization catalyst containing an antimony-based, titanium-based, germanium-based or aluminum-based compound, or a polymerization catalyst containing the composite compound can be used.

The polymerization reaction conditions can be appropriately selected depending on monomers, catalysts, reaction apparatuses and intended resin physical properties, and are not particularly limited, but for example, the reaction temperature is usually about 150° C. to about 300° C., about 200° C. to about 300° C. or about 260° C. to about 300° C. Furthermore, the reaction pressure is usually atmospheric pressure to about 2.7 Pa, where the pressure may be reduced in the latter half of the reaction.

The polymerization reaction proceeds by volatilizing leaving reactants such as a diol, an alkyl compound or water.

The polymerization apparatus may also be one which is completed by one reaction tank or connects a plurality of reaction tanks. In this case, the reactants are polymerized while being transferred between the reaction tanks, depending on the degree of polymerization. In addition, a method, in which a horizontal reaction apparatus is provided in the latter half of the polymerization and the reactants are volatilized while heating/kneading, may also be adopted.

After completion of the polymerization, the resin is discharged from the reaction tank or the horizontal reaction apparatus in a molten state, and then, obtained in the form of flakes cooled and pulverized in a cooling drum or a cooling belt, or in the form of pellets tailored after being introduced into an extruder and extruded in a string shape. Furthermore, solid-phase polymerization may be performed as needed, thereby improving the molecular weight or decreasing the low molecular weight component. As the low molecular weight component that may be contained in the PET resin, a cyclic trimer component may be exemplified, but the content of such a cyclic trimer component in the resin is usually controlled to 5,000 ppm or less, or 3,000 ppm or less.

The molecular weight of the PET-based resin is usually in a range of 0.45 to 1.0 dL/g, 0.50 to 1.0 dL/g or 0.52 to 0.80 dL/g, when the resin has been dissolved in a mixed solvent of phenol/tetrachloroethane=50/50 (weight ratio) and it has been represented as a limiting viscosity measured at 30° C.

In addition, the PET-based resin may contain additives as required. The additive may include a lubricant, an anti-blocking agent, a heat stabilizer, an antioxidant, an antistatic agent, a light stabilizer and an impact resistance improver, and the like. The addition amount thereof is preferably within a range that does not adversely affect the optical properties.

The PET-based resin is used in the form of pellets assembled by an ordinary extruder, for formulation of such additives and film molding to be described below. The size and shape of the pellets are not particularly limited, but they are generally a cylindrical, spherical or flat spherical shape having both height and diameter of 5 mm or less. The PET-based resin thus obtained can be molded into a film form and subjected to a stretching treatment to obtain a transparent and homogeneous PET film having high mechanical strength. The production method thereof is not particularly limited, and for example, the following method is adopted.

Pellets made of the dried PET resin are supplied to a melt extrusion apparatus, heated to a melting point or higher and melted. Next, the melted resin is extruded from the die and quenched and solidified on a rotary cooling drum to a temperature below the glass transition temperature to obtain an un-stretched film in a substantially amorphous state. This melting temperature is determined according to the melting point of the PET-based resin to be used or the extruder, which is not particularly limited, but is usually 250° C. to 350° C. In order to improve planarity of the film, it is also preferred to enhance adhesion between the film and the rotary cooling drum, and an adhesion method by electrostatic application or an adhesion method by liquid coating is preferably adopted. The adhesion method by electrostatic application is usually a method in which linear electrodes are provided on the upper surface side of a film in a direction perpendicular to the flow of the film and a direct current voltage of about 5 to 10 kV is applied to the electrodes to provide static charges to the film, thereby improving the adhesion between the rotary cooling drum and the film. In addition, the adhesion method by liquid coating is a method for improving the adhesion between the rotary cooling drum and the film by uniformly coating a liquid to all or a part (for example, only the portion in contact with both film ends) of the surface of the rotary cooling drum. Both of them may also be used in combination if necessary. The PET-based resin to be used may be mixed with two or more resins, or resins having different structures or compositions, if necessary. For example, it may include using a mixture of pellets blended with a particulate filling material as an anti-blocking agent, an ultraviolet absorbing agent or an antistatic agent, and the like, and non-blended pellets, and the like.

Furthermore, the laminating number of films to be extruded may also be two or more layers, if necessary. For example, it may include that pellets blended with a particulate filling material as an anti-blocking agent and non-blended pellets are prepared and supplied from the other extruder to the same die to extrude a film composed of two kinds and three layers, "blended with filling material/no-blended/blended with filling material," and the like.

The un-stretched film is usually stretched longitudinally at a temperature not lower than the glass transition temperature in the extrusion direction first. The stretching temperature is usually 70 to 150° C., 80 to 130° C., or 90 to 120° C. In addition, the stretching ratio is usually 1.1 to 6 times or 2 to 5.5 times. The stretching may be terminated once or divided into more than once as necessary.

The longitudinally stretched film thus obtained may be subjected to a heat treatment thereafter. Then, a relaxation treatment may be performed if necessary. The heat treatment temperature is usually 150 to 250° C., 180 to 245° C. or 200 to 230° C. Also, the heat treatment time is usually 1 to 600 seconds or 1 to 300 seconds or 1 to 60 seconds.

The temperature of the relaxation treatment is usually 90 to 200° C. or 120 to 180° C. Also, the amount of relaxation is usually 0.1 to 20% or 2 to 5%. The relaxation treatment temperature and the relaxation amount can be set so that a heat shrinkage rate of the PET film after relaxation treatment at 150° C. is 2% or less.

In the case of obtaining uniaxially stretched and biaxially stretched films, transverse stretching is usually performed by a tenter after the longitudinal stretching treatment or after the heat treatment or relaxation treatment, if necessary. The stretching temperature is usually 70 to 150° C., 80 to 130° C., or 90 to 120° C. In addition, the stretching ratio is usually 1.1 to 6 times or 2 to 5.5 times. Thereafter, the heat treatment and, if necessary, the relaxation treatment can be performed. The heat treatment temperature is usually 150 to 250° C. or 180 to 245° C. or 200 to 230° C. The heat treatment time is usually 1 to 600 seconds, 1 to 300 seconds, or 1 to 60 seconds.

The temperature of the relaxation treatment is usually 100 to 230° C., 110 to 210° C. or 120 to 180° C. Also, the relaxation amount is usually 0.1 to 20%, 1 to 10%, or 2 to 5%. The relaxation treatment temperature and the relaxation amount can be set so that the heat shrinkage rate of the PET film after the relaxation treatment at 150° C. is 2% or less.

In uniaxial stretching and biaxial stretching treatments, in order to alleviate deformation of the orientation main axis as represented by bowing, the heat treatment can be performed again or the stretching treatment can be performed after the transverse stretching. The maximum value of deformation in the orientation main axis by bowing with respect to the stretching direction is usually within 45 degrees, within 30 degrees, or within 15 degrees. Here, the stretching direction also refers to a stretching large direction in longitudinal stretching or transverse stretching.

In the biaxial stretching of the PET film, the transverse stretching ratio is usually slightly larger than the longitudinal stretching ratio, where the stretching direction refers to a direction perpendicular to the long direction of the film. Also, the uniaxial stretching is usually stretched in the transverse direction as described above, where the stretching direction equally refers to a direction perpendicular to the long direction.

Also, the orientation main axis refers to a molecular orientation direction at any point on the stretched PET film. Furthermore, the deformation of the orientation main axis with respect to the stretching direction refers to an angle difference between the orientation main axis and the stretching direction. In addition, the maximum value thereof refers to a maximum value of the values on the vertical direction with respect to the long direction.

The direction of identifying the orientation main axis is known, and for example, it can be measured using a retardation film/optical material inspection apparatus RETS (manufactured by Otsuka Densi KK) or a molecular orientation system MOA (manufactured by Oji Scientific Instruments).

The stretched PET film used in the present application may be imparted with antiglare properties (haze). The method of imparting antiglare properties is not particularly limited, and for example, a method of mixing inorganic particulates or organic particulates into the raw resin to form a film, a method of forming a stretched film from an un-stretched film having a layer, in which inorganic particulates or organic particulates are mixed, on one side, based on the method of producing the film, or a method of coating a coating liquid formed by mixing inorganic particulates or organic particulates with a curable binder resin on one side of a stretched PET film and curing the binder resin to form an antiglare layer, and the like is adopted.

The inorganic particulates for imparting antiglare properties are not particularly limited, but may include, for example, silica, colloidal silica, alumina, alumina sol, an aluminosilicate, an alumina-silica composite oxide, kaolin, talc, mica, calcium carbonate, and the like. Also, the organic particulates are not particularly limited, but may include, for example, crosslinked polyacrylic acid particles, methyl methacrylate/styrene copolymer resin particles, crosslinked polystyrene particles, crosslinked polymethyl methacrylate particles, silicone resin particles and polyimide particles, and the like. The antiglare property-imparted stretched PET film thus obtained may have a haze value in a range of 6 to 45%.

A functional layer such as a conductive layer, a hard coating layer and a low reflective layer may be further laminated on the antiglare property-imparted stretched PET film. Furthermore, as the resin composition constituting the antiglare layer, a resin composition having any one of these functions may also be selected.

The haze value can be measured using, for example, a haze-permeability meter HM-150 (manufactured by Murakami Color Research Laboratory, Co., Ltd.) in accordance with JIS K 7136. In the measurement of the haze value, in order to prevent the film from being warped, for example, a measurement sample in which the film surface is bonded to a glass substrate using an optically transparent pressure-sensitive adhesive so that the antiglare property-imparted surface becomes the surface can be used.

The functional layer other than the antiglare layer or the like can be laminated on one side or both sides of the stretched PET film used in the present application, unless it interferes with the effect of the present application. The functional layer to be laminated may include, for example, a conductive layer, a hard coating layer, a smoothing layer, an easily slipping layer, an anti-blocking layer and an easy adhesion layer, and the like.

The above-described method for producing a PET film is one exemplary method for obtaining the polymer film substrate of the present application, where as long as the polymer film substrate applicable in the present application has the above-described physical properties, any kind of commercially available product can also be used.

In one example, the polymer film substrate may be a film substrate that an electrode layer is formed on one side. Such a film substrate may be referred to as an electrode film substrate. The above-mentioned retardation or mechanical properties, and the like may be for the polymer film substrate on which the electrode layer is not formed, or for the electrode film substrate.

In the case of the electrode film substrate, each of electrode layers may be formed on at least one side of the polymer film substrate, and first and second polymer film substrates may be disposed so that the electrode layers face each other.

As the electrode layer, a known transparent electrode layer may be applied, and for example, a so-called conductive polymer layer, a conductive metal layer, a conductive nanowire layer, or a metal oxide layer such as ITO (indium tin oxide) may be used as the electrode layer. Besides, various materials and forming methods capable of forming a transparent electrode layer are known, which can be applied without limitation.

In addition, an alignment film may be formed on one side of the polymer film substrate, and for example, may be formed on the upper part of the electrode layer in the case of the electrode film substrate. A known alignment film can be formed as the alignment film, and the kind of alignment film that can be applied according to a desired mode is known.

As described above, in the present application, the light modulation layer included in the light modulation film layer is a functional layer capable of changing the transmittance, reflectivity and/or haze of light depending on whether or not an external signal is applied. Such a light modulation layer can be referred to as an active light modulation layer herein.

The external signal herein may mean any external factors, such as an external voltage, that may affect the behavior of a material contained in the light modulation layer, for example, a light modulating material. Therefore, the state without external signal may mean a state where no external voltage or the like is applied.

In the present application, the type of the light modulation layer is not particularly limited as long as it has the above-described functions, and a known light modulation layer can be applied. The light modulation layer may be, for example, a liquid crystal layer, an electrochromic material layer, a photochromic material layer, an electrophoretic material layer, or a dispersed particle orientation layer. Hereinafter, the above-illustrated light modulation layer will be described by way of specific examples, but the configuration of the light modulation layer is not limited to the following, and the known contents relating to the light modulation layer can be applied to the present application without limitation.

The liquid crystal layer is a layer containing a liquid crystal compound. In this specification, the term liquid crystal layer includes all the layers containing a liquid crystal compound, and for example, a so-called guest host layer including a liquid crystal compound (liquid crystal host) and a dichroic dye is also a kind of liquid crystal layer defined herein, as described below. The liquid crystal layer may be an active liquid crystal layer, and thus the liquid crystal compound may exist in the liquid crystal layer such that the orientation direction changes depending on whether or not an external signal is applied. As the liquid crystal compound, any kind of liquid crystal compound can be used as far as the orientation direction can be changed by application of an external signal. For example, a smectic liquid crystal compound, a nematic liquid crystal compound or a cholesteric liquid crystal compound can be used as the liquid crystal compound. Furthermore, the liquid crystal compound may be, for example, a compound which has no polymerizable group or crosslinkable group so that the orientation direction can be changed by application of an external signal.

The liquid crystal layer may comprise a liquid crystal compound whose dielectric constant anisotropy is positive or negative. The absolute value of the dielectric constant anisotropy of the liquid crystal can be appropriately selected in consideration of the object of the present application. The term "dielectric constant anisotropy ($\Delta\varepsilon$)" may mean a difference ($\varepsilon// - \varepsilon\perp$) between the horizontal dielectric permittivity ($\varepsilon//$) and the vertical permittivity ($\varepsilon\perp$) of the liquid crystal. In this specification, the term "horizontal permittivity ($\varepsilon//$) means a dielectric constant value measured along the direction of an electric field in a state where a voltage is applied so that the director of the liquid crystal and the direction of the electric field by the applied voltage are substantially horizontal, and the vertical permittivity ($\varepsilon\perp$) means a dielectric constant value measured along the direction of an electric field in a state where a voltage is applied so that the director of the liquid crystal and the direction of the electric field by the applied voltage are substantially perpendicular.

The driving mode of the liquid crystal layer may be exemplified by, for example, a DS (dynamic scattering) mode, an ECB (electrically controllable birefringence) mode, an IPS (in-plane switching) mode, an FFS (fringe-field switching) mode, an OCB (optically compensated bend) mode, a VA (vertical alignment) mode, an MVA (multi-domain vertical alignment) mode, a PVA (patterned vertical alignment) mode, an HAN (hybrid aligned nematic) mode, a TN (twisted nematic) mode, an STN (super twisted nematic) mode, or the like.

In one example, the liquid crystal layer may be a polymer network liquid crystal layer. The polymer network liquid crystal layer is a super-ordinate concept including a so-called polymer dispersed liquid crystal layer or a polymer stabilized liquid crystal layer, and the like. The polymer network liquid crystal layer may include, for example, a polymer network and a liquid crystal region including a liquid crystal compound dispersed in a phase-separated state. Here, the liquid crystal compound may be present in the polymer network such that the orientation is switchable. The polymer network may be a polymer network of a precursor comprising a polymerizable or crosslinkable compound, where the polymerizable or crosslinkable compound may form the polymer network in a polymerized state or a crosslinked state. As the polymerizable or crosslinkable compound, for example, a compound having a (meth)acryloyl group may be used, without being limited thereto.

In another example, the liquid crystal layer may be a pixel-isolated liquid crystal layer (PILC). The pixel-isolated liquid crystal layer means a liquid crystal layer in which barrier rib structures for maintaining the cell gap are introduced for each pixel. The pixel-isolated liquid crystal layer may comprise a liquid crystal compound whose alignment direction can be changed by a signal applied by the outside. The pixel-isolated liquid crystal layer can also control the light transmittance using the alignment state of such a liquid crystal compound.

The electrochromic material layer uses, for example, a phenomenon in which the light transmittance of the electrochromic material is changed by an electrochemical redox reaction. The electrochromic material cannot be colored in a state where an electrical signal is not applied, but can be colored in a state where an electrical signal is applied, so that the light transmittance can be controlled.

The photochromic material layer can vary the light transmittance, for example, using a phenomenon in which the binding state of the photochromic material changes and the color changes (reversibly) when light of a specific wavelength is irradiated. In general, the photochromic material is colored when exposed to ultraviolet rays, and has an inherent light color when irradiated with visible light, but is not limited thereto.

The electrophoretic material layer can vary the light transmittance, for example, by a combination of a medium liquid and an electrophoretic material. In one example, as the electrophoretic material, particles having positive (+) or negative (−) charges and having a color can be used, where the light transmittance can be controlled to represent the desired color by a method of rotating the electrophoretic particles or moving them closer to the electrode with different polarity depending on the voltage applied to two electrodes on the top and bottom of the electrophoretic material layer, but is not limited thereto.

The dispersed particle orientation layer comprises, for example, a structure in which a thin film laminate of nano-sized rod-shaped particles is floated on liquid crystals. For example, as the suspended particles exist in a unaligned state in a state where no external signal is applied, the dispersed particle orientation layer can block and absorb light, and as the suspended particles are aligned in a state where an external signal is applied, it can transmit light, without being limited thereto.

The liquid modulation layer may further comprise a dichroic dye in terms of controlling variable light transmittance characteristics. In this specification, the term "dye" may mean a material capable of intensively absorbing and/or deforming light in at least a part or all of the ranges within a visible light region, for example, within a wavelength range of 400 nm to 700 nm, and the term "dichroic dye" may mean a material capable of anisotropic absorption of light in at least a part or all of the ranges of the visible light region. Such a dye is known, for example, as an azo dye or an anthraquinone dye, and the like, but is not limited thereto.

In one example, the light modulation layer is a liquid crystal layer comprising liquid crystal and dichroic dyes, which may be a so-called guest host liquid crystal layer (guest host liquid crystal cell). The term "GHLC layer" may mean a functional layer that dichroic dyes are arranged together depending on arrangement of liquid crystals to exhibit anisotropic light absorption characteristics with respect to an alignment direction of the dichroic dyes and the direction perpendicular to the alignment direction, respectively. For example, the dichroic dye is a substance whose absorption rate of light varies with a polarization direction, where if the absorption rate of light polarized in the long axis direction is large, it may be referred to as a p-type dye, and if the absorption rate of polarized light in the short axis direction is large, it may be referred to as an n-type dye. In one example, when a p-type dye is used, the polarized light vibrating in the long axis direction of the dye may be absorbed and the polarized light vibrating in the short axis direction of the dye may be less absorbed to be transmitted. Hereinafter, unless otherwise specified, the dichroic dye is assumed to be a p-type dye.

The light modulation film layer comprising the guest host liquid crystal layer as the light modulation layer may function as an active polarizer. In this specification, the term "active polarizer" may mean a functional element capable of controlling anisotropic light absorption depending on external signal application. Such an active polarizer can be distinguished from a passive polarizer, which is described below, having constant light absorption or light reflection characteristics regardless of the external signal application. The guest host liquid crystal layer can control the anisotropic light absorption for the polarized light in the direction parallel to the arrangement direction of dichroic dyes and the polarized light in the vertical direction by controlling the arrangement of liquid crystals and dichroic dyes. Since the arrangement of liquid crystals and dichroic dyes can be controlled by the application of the external signal such as a magnetic field or an electric field, the guest host liquid crystal layer can control anisotropic light absorption depending on the external signal application.

The thickness of the light modulation layer can be appropriately selected in consideration of the object of the present application. In one example, the thickness of the light modulation layer may be about 0.01 μm or more, 0.1 μm or more, 1 μm or more, 2 μm or more, 3 μm or more, 4 μm or more, 5 μm or more, 6 μm or more, 7 μm or more, 8 μm or more, 9 μm or more, or 10 μm or more. By controlling the thickness in this way, it is possible to realize a device having a large difference in transmittance or reflectance depending on the mode state. The thicker the thickness, the higher the transmittance and/or reflectance difference can be realized, so that it is not particularly limited, but it may generally be about 30 μm or less, 25 μm or less, 20 μm or less, or 15 μm or less.

According to one example of the present invention, when the light modulation layer is a liquid crystal layer, the arrangement of the light axis of the light modulation layer in the specific state and the first direction (for example, the above-described slow axis direction or TD direction) of the polymer film substrate can be adjusted to further improve the optical characteristics.

In the present application, a known method can be applied to the method of implementing the light modulation film layer having such a shape, other than disposing the above-mentioned polymer film substrate as a substrate in the above-mentioned manner.

Accordingly, the light modulation film layer may also further comprise a spacer or a sealant, and the like, in addition to a known structure, for example, the substrate, the light modulation layer and the electrode layer, as described above.

The light modulation device of the present application may also comprise other additional configurations, if necessary, while basically comprising the above-mentioned light modulation film layer. That is, depending on the driving mode, the light modulation film layer alone can realize the above-described transmission, blocking, high reflection and/or low reflection modes and switch between them, but additional configurations can also be included in order to facilitate the implementation or switching of such a mode.

For example, the device may further comprise a polarizer (passive polarizer) disposed on at least one side of the light modulation film layer. FIG. 2 shows, as an example of the above structure, a form in which a polarizer (14) is disposed on one side of the light modulation film layer having a light modulation layer (12) positioned between the first and second polymer film substrates (11, 13).

In this case, the angle formed by the transmission axis, the absorption axis or the reflection axis of the passive polarizer and the first direction (for example, the above-described slow axis direction or TD direction) of the polymer film substrate may be in 0 to 10 degrees, 0 to 5 degrees or about 0 degrees, or may be in a range of 80 degrees to 100 degrees, in a range of 85 degrees to 95 degrees, or about 90 degrees. The angle is an acute angle of angles formed by the transmission axis, the absorption axis or the reflection axis and the first direction (for example, the above-described ground axis direction or TD direction). This arrangement can further improve the optical and mechanical properties.

Also, in an embodiment comprising the polarizer, when the light modulation layer is a liquid crystal layer that can exist in a horizontal orientation state, the light axis of the light modulation layer upon horizontal orientation and the first direction (for example, the slow axis direction or the TD direction) may be in 0 degrees to 10 degrees, 0 degrees to 5 degrees or approximately 0 degrees, or may form an angle of 80 degrees to 100 degrees, 85 degrees to 95 degrees, or approximately 90 degrees.

In this specification, the term polarizer may mean an element that converts natural light or unpolarized light into polarized light. Also, the definitions of the passive polarizer and the active polarizer are as described above. In one example, the polarizer may be a linear polarizer. In this specification, the linear polarizer means a case where the selectively transmitting light is linearly polarized light that vibrates in any one direction and the selectively absorbing or reflecting light is linearly polarized light that vibrates in directions orthogonal to the vibration direction of the linearly polarized light. That is, the linear polarizer may have a transmission axis and absorption axes or reflection axes orthogonal to each other in the plane direction.

The polarizer may be an absorptive polarizer or a reflective polarizer. As the absorptive polarizer, for example, a polarizer in which iodine is dyed to a polymer stretched film such as a PVA stretched film, or a guest-host polarizer in which liquid crystals polymerized in an oriented state are used as a host and dichroic dyes arranged along the orientation of the liquid crystals are used as a guest may be used, without being limited thereto.

As the reflective polarizer, for example, a reflective polarizer known as a so-called DBEF (dual brightness enhancement film) or a reflective polarizer formed by coating a liquid crystal compound such as LLC (lyotropic liquid crystal) may be used, but is not limited thereto.

The light modulation device may have a structure in which the polarizers are disposed on both sides of the light modulation film layer. In this case, the angle formed by the transmission axes of the polarizers disposed on both sides may be in the range of 85 degrees to 95 degrees, or approximately perpendicular.

The light modulation device of the present application may comprise two or more light modulation film layers. In this case, each of the light modulation film layers may comprise two substrates, or may also share at least one substrate. For example, the light modulation device may have a structure in which a first substrate, a first light modulation layer, a second substrate, a third substrate, a second light modulation layer and a fourth substrate are sequentially laminated, or may have a structure in which a first substrate, a first light modulation layer, a second substrate, a second light modulation layer and a third substrate are sequentially laminated. In this case, at least two substrates in the above structure may also be the asymmetric polymer film substrate as described above, and all the substrates may be the asymmetric polymer film substrate. In one example, when all the substrates are the asymmetric polymer film substrate, the angle formed by the first directions (for example, the above-described slow axis directions or TD directions) of all the polymer film substrates may be in the range of 0 to 10 degrees, in the range of 0 to 5 degrees, or about 0 degrees.

FIG. 3 shows a light modulation device according to one example of the present application. The light modulation device may comprise first to third polymer film substrates (21, 23, 25) sequentially overlapped and disposed one another, a first light modulation layer (22) positioned between the first and second polymer film substrates (21, 23); and a second light modulation layer (24) positioned between the second and third polymer film substrates (23, 25).

In this specification, the fact that two or more polymer film substrates are overlapped and disposed may mean that light transmitted through any one polymer film substrate can be incident on another polymer film substrate.

At least two of the first to third polymer film substrates may be the asymmetric polymer film substrate as described above, and all may be the asymmetric polymer film substrate.

When all the substrates are the asymmetric polymer film substrate, the first direction (for example, the above-described slow axis direction or TD direction) of each of the first and third polymer film substrates may be an angle in the range of 0 to 10 degrees or 0 to 5 degrees to each other, or may be approximately horizontal to each other.

Furthermore, the angle formed by the first directions (for example, the above-described slow axis directions or TD directions) of the first and third polymer film substrates and the first direction (for example, the above-described slow axis direction or TD direction) of the second polymer film substrate may be 0 to 10 degrees, 0 to 5 degrees or about 0 degrees, or may be in the range of 80 to 100 degrees or 85 to 95 degrees, or may be about 90 degrees.

FIG. 4 illustratively shows a light modulation device according to another example of the present application. The light modulation device may comprise first to fourth polymer film substrates (31, 33, 34, 36) sequentially overlapped and disposed one another; a first light modulation layer (32) positioned between the first and second polymer film substrates (31, 33); and a second light modulation layer (35) positioned between the third and fourth polymer film substrates (34, 36).

At least two of the first to fourth polymer film substrates, for example, all may be the above-described asymmetric polymer film substrate.

In one example, the second and third polymer film substrates may be disposed so that the first directions (for example, the above-described slow axis directions or TD directions) are approximately 0 degrees to 10 degrees, 0 degrees to 5 degrees, or 0 degrees to each other.

In one example, the angle formed by the first direction (for example, the above-described slow axis direction or TD direction) of the first and fourth polymer film substrates and the first direction (for example, the above-described slow axis direction or TD direction) of the second and third polymer film substrates may be about 0 to 10 degrees, 0 to 5 degrees or about 0 degrees, may be in the range of about 80 to 100 degrees or 85 to 95 degrees, or may be about 90 degrees.

In a light modulation device comprising two or more light modulation film layers, there may be a horizontal orientation state of orientation states that the first and second light modulation layers may implement, and in this case, the light axis of the first and second light modulation layers in the horizontal orientation and the first direction of the first to third polymer film substrates may be in the range of 0 to 10 degrees or in the range of 0 to 5 degrees, or about 0 degrees, or may be in the range of 80 to 100 degrees, may be in the range of 85 to 95 degrees, or may form an angle of about 90 degrees.

In addition, in the light modulation device comprising the four substrates, each of the first and second light modulation layers may be a liquid crystal layer that may exist in a horizontal orientation state, and the light axis of the first and second light modulation layers in the horizontal orientation and the first direction of the first to fourth polymer film substrates may be in the range of 0 to 10 degrees or in the range of 0 to 5 degrees, or about 0 degrees, or may be in the range of 80 to 100 degrees, may be in the range of 85 to 95 degrees, or may form an angle of about 90 degrees.

In this specification, the term horizontal orientation state may mean a state where the directors of the liquid crystal compound in the light modulation layer are arranged substantially parallel to the plane of the liquid crystal layer, for example, an arrangement state of forming 0 to 10 degrees, 0 to 5 degrees or about 0 degrees.

In this specification, the term vertical orientation state may mean a state where the directors of the liquid crystal compound in the light modulation layer are arranged substantially perpendicular to the plane of the liquid crystal layer, for example, an arrangement state of about 80 degrees to 100 degrees, or 85 degrees to 95 degrees or about 90 degrees.

In this specification, the director of the liquid crystal molecule or the liquid crystal compound may mean a light axis (optical axis) or a slow axis of the liquid crystal layer. The director of the liquid crystal molecule may mean the long axis direction when the liquid crystal molecule has a rod shape and may mean a normal direction axis of the disk plane when the liquid crystal molecule has a discotic shape.

When the light modulation device of the present application comprises the first and second light modulation layers, it is possible to secure excellent left-right symmetry by adjusting the light axes upon horizontal orientation between the first and second light modulation layers to reduce the contrast ratio difference in the right and left viewing angles.

In one example, each of the first and second light modulation layers may be a liquid crystal layer capable of switching between vertical orientation and horizontal orientation states and the light axes of the first and second light modulation layers in the horizontal orientation state may be in a range of about 80 degrees to 100 degrees, in a range of about 85 degrees to 95 degrees, or about 90 degrees.

In one example, as shown in FIG. 5, the light axis (OA) of the first light modulation layer (10) upon horizontal orientation may form an angle in a range of 40 degrees to 50 degrees in the clockwise direction based on the horizontal axis (WA) and the light axis (OA) of the second light modulation layer (20) upon horizontal orientation may form an angle in a range of 130 degrees to 140 degrees in the clockwise direction based on the light modulation layer horizontal axis (WA).

The light axis of such a light modulation layer is usually determined according to the orientation direction of the alignment film, which may be measured for the light modulation layer in the following manner. It can be confirmed by first disposing an absorptive linear polarizer on one side of the first or second light modulation layer in a state where the light modulation layer is horizontally oriented and measuring the transmittance while rotating the polarizer 360 degrees. That is, the light axis direction can be confirmed by irradiating the light modulation layer or the absorptive linear polarizer side in the above state with light and simultaneously measuring the luminance (transmittance) at the other side. For example, when the transmittance is minimized in the process of rotating the polarizer 360 degrees, an angle that is perpendicular to the absorption axis of the polarizer or an angle that is horizontal thereto may be defined as the direction of the light axis.

In this specification, the horizontal axis (WA) of the light modulation layer may mean a direction parallel to the long axis direction of the light modulation layer or a direction parallel to the line connecting both eyes of an observer wearing eyewear or an observer observing a display device when the light modulation layer has been applied to the eyewear or the display device.

According to the light modulation device according to each of examples, the above-mentioned alignment film may be formed on both sides of the light modulation layer, respectively. In one example, the alignment film may be a vertical alignment film. According to one example of the present application, the light modulation device may sequentially comprise a first polymer film substrate, a first alignment film, a light modulation layer, a second alignment film, a second polymer film substrate and a polarizer. According to a second example of the present application, the light modulation device may sequentially comprise a first polymer film substrate, a first vertical alignment film, a first light modulation layer, a second vertical alignment film, a second polymer film substrate, a third vertical alignment film, a second light modulation layer, a fourth vertical alignment film and a third polymer film substrate. According to a third example of the present application, the light modulation device may comprise a first polymer film substrate, a first vertical alignment film, a first light modulation layer, a second vertical alignment film, a second polymer film substrate, a third polymer film substrate, a third vertical alignment film, a second light modulation layer, a fourth vertical alignment film and a fourth polymer film substrate.

The light modulation device of the present application can control transmittance, reflectance or haze by adjusting the orientation direction of the light modulation layer upon no voltage application and/or upon voltage application. The orientation direction can be adjusted by adjusting the pretilt angle and pretilt direction of the alignment film.

In this specification, the pretilt may have an angle and a direction. The pretilt angle may be referred to as a polar angle, and the pre-tilt direction may also be referred to as an azimuthal angle.

The pretilt angle may mean an angle formed by the director of the liquid crystal molecule relative to a horizontal plane with the alignment film or an angle formed with the surface normal direction of the light modulation layer. The pretilt angle of the vertical alignment film can induce a vertical orientation state when the voltage is not applied to the liquid crystal cell.

In one example, the first to fourth vertical alignment films may have a pretilt angle in a range of 70 degrees to 89 degrees. When the pretilt angle is within the above range, it is possible to provide a light modulation device having excellent initial transmittance. In one example, the pretilt angle may be about 71 degrees or more, 72 degrees or more, about 73 degrees or more, or about 74 degrees or more, or may be about 88.5 degrees or less, or about 88 degrees or less.

In one example, the pretilt angle of the first vertical alignment film may be an angle measured in the clockwise direction or the counterclockwise direction based on the horizontal plane with the alignment film, and the pretilt angle of the second vertical alignment film may be an angle measured in a direction opposite to the direction, that is, the counterclockwise direction when the pretilt angle of the first vertical alignment film is measured in the clockwise direction or the clockwise direction when the pretilt angle of the first vertical alignment film is measured in the counterclockwise direction.

Also, the pretilt angle of the third vertical alignment film may be an angle measured in the clockwise direction or the counterclockwise direction based on the horizontal plane with the alignment film, and the pretilt angle of the fourth vertical alignment film may be an angle measured in a direction opposite to the direction, that is, the counterclockwise direction when the pretilt angle of the third vertical alignment film is measured in the clockwise direction or the clockwise direction when the pretilt angle of the third vertical alignment film is measured in the counterclockwise direction.

The pretilt direction may mean a direction in which the director of the liquid crystal molecule is projected on a horizontal plane of the alignment film. In one example, the pretilt direction may be an angle formed by the projected direction and the horizontal axis (WA). The pretilt direction of the vertical alignment film can induce the orientation direction of the horizontal orientation state when a voltage is applied to the liquid crystal cell.

According to a second or third example, the pretilt directions of the first and second vertical alignment films and the pretilt directions of the third and fourth vertical alignment films may intersect with each other. In one example, the pretilt directions of the first and second vertical alignment films and the pretilt directions of the third and fourth vertical alignment films may be orthogonal to each other, for example, 85 degrees to 95 degrees or about 90 degrees. If the pretilt direction satisfies the above condition, it is possible to provide a light modulation device having an excellent shading ratio when a voltage is applied.

In one example, any one direction among the pretilt directions of the first and second vertical alignment films and the pretilt directions of the third and fourth vertical alignment films, for example, the pretilt directions of the first and second vertical alignment films may have a light axis (OA) in a range of 40 to 50 degrees in the clockwise direction based on the horizontal axis (WA) of the light modulation layer and the other direction, for example, the pretilt directions of the third and fourth vertical alignment films may have a light axis (OA) in a range of 130 degrees to 140 degrees in a clockwise direction based on a horizontal axis (WA) of the light modulation layer. Through this relationship, it is possible to provide a light modulation device having excellent left-right symmetry by reducing the difference in contrast ratio in the left and right viewing angles.

In one example, the pretilt angle and direction as mentioned above may be a pretilt angle and direction measured in each liquid crystal layer when the liquid crystal layer is in a vertical orientation state.

The first to fourth vertical alignment films may be rubbing alignment films or photo alignment films. In the case of the rubbing alignment film, the orientation direction is determined by the rubbing direction, and in the case of the photo alignment film, it is determined by the polarization direction of the irradiated light. The pretilt angle and the pretilt direction of the vertical alignment film may be implemented by appropriately adjusting orientation conditions, for example, a rubbing condition or a pressure condition upon rubbing, or optical orientation conditions, for example, a polarizing state of light, an irradiation angle of light, an irradiation intensity of light, and the like.

For example, when the vertical alignment film is a rubbing alignment film, the pretilt angle can be achieved by controlling the rubbing intensity of the rubbing alignment film, and the pretilt direction can be achieved by controlling the rubbing direction of the rubbing alignment film, where such an accomplishing method is a known method. Furthermore, in the case of the photo alignment film, it can be achieved by alignment film materials, the direction, state or intensity of the polarized light applied to the orientation, and the like.

In one example, the first to fourth vertical alignment films may be rubbing alignment films. Each of the first to fourth vertical alignment films may have a specific orientation direction.

For example, the rubbing directions of the first and second vertical alignment films are opposite to each other, which may form about 170 degrees to 190 degrees, and the rubbing directions of the third and fourth vertical alignment films are also opposite to each other, which may form about 170 degrees to 190 degrees.

The rubbing direction can be confirmed by measuring the pretilt angle, and since the liquid crystals generally lie along the rubbing direction and simultaneously generate the pretilt angle, it is possible to measure the rubbing direction by measuring the pretilt angle in the manner described in the following examples.

In one example, as shown in FIG. 6, the direction (RA) of the rubbing orientation of the first vertical alignment film (12) may be 40 to 50 degrees, the direction (RA) of the rubbing orientation of the second vertical alignment film (14) may be 220 to 230 degrees, the direction (RA) of the rubbing orientation of the third vertical alignment film (22) may be 130 to 140 degrees and the direction (RA) of the rubbing orientation of the fourth vertical alignment film (24) may be 310 to 320 degrees. Through this relationship of rubbing orientation directions of the first to fourth vertical alignment films, it is possible to provide a light modulation device in which the switching between the vertical alignment state and the horizontal alignment state can be effectively performed. Each direction (RA) of the rubbing orientations is an angle measured in the clockwise direction or counterclockwise direction based on the horizontal axis (WA). However, the direction of measuring each direction (RA) of the rubbing orientations is measured by selecting only any one of the clockwise and counterclockwise directions.

An exemplary light modulation device may further comprise the above-described electrode layers disposed outside the first to fourth alignment films. In this specification, the outside of any configuration may mean the opposite side of the side where the light modulation layer is present. The electrode films disposed outside the first to fourth alignment films may be referred to as first to fourth electrode layers, respectively.

The electrode layer may comprise a transparent electrode layer. The electrode layer can apply an appropriate electric field to the light modulation layer so as to switch the alignment state of the light modulation layer. The direction of the electric field may be a vertical or horizontal direction, for example, a thickness direction or a plane direction of the light modulation layer.

The light modulation device of the present application may further comprise a pressure-sensitive adhesive. For example, the light modulation film layer and the polarizer may be present in a state of being bonded to each other by the pressure-sensitive adhesive. In another example, the first and second light modulation film layers may be present in a state of being bonded to each other by the pressure-sensitive adhesive. As the pressure-sensitive adhesive, a pressure-sensitive adhesive layer used for attaching optical members may be appropriately selected and used. The thickness of the pressure-sensitive adhesive may be appropriately selected in consideration of the object of the present application.

The light modulation device of the present application may further comprise a hard coating film. The hard coating film may comprise a base film and a hard coating layer on the base film. The hard coating film may be appropriately selected from known hard coating films and used in consideration of the object of the present application. The thickness of the hard coating film may be appropriately selected in consideration of the object of the present application.

The hard coating film may be formed on the outside of the light modulation device through a pressure-sensitive adhesive.

The light modulation device of the present application may further comprise an antireflection film. The antireflection film may comprise a base film and an antireflective layer on the base film. The antireflection film may be appropriately selected from known antireflection films and used in consideration of the object of the present application. The thickness of the antireflection film can be appropriately selected in consideration of the object of the present application.

The light modulation device of the present application may further comprise a dye layer with NIR (near-infrared) blocking function. The dye may be added to exclude a sensor malfunction due to an external light component by blocking the IR of a region corresponding to the main wavelength of the IR sensor. The dye may be coated on one side of the first to fourth polymer film substrates or may also be added to a pressure-sensitive adhesive or an adhesive when the first and second light modulation film layers are to be bonded together with the pressure-sensitive adhesive or the adhesive.

The antireflection film may be formed on the outside of the light modulation device through a pressure-sensitive adhesive.

Such a light modulation device can be applied to various applications. The applications to which the light modulation device can be applied can be exemplified by openings in enclosed spaces including buildings, containers or vehicles, and the like, such as windows or sunroofs, or eyewear, and the like. Here, in the range of eyewear, all eyewear formed so that an observer can observe the outside through lenses, such as general glasses, sunglasses, sports goggles or helmets, or instruments for experiencing augmented reality, can be included.

A typical application to which the light modulation device of the present application can be applied is eyewear. Recently, for sunglasses, sports goggles, instruments for experiencing augmented reality, and the like, the eyewear in which a lens is mounted so as to be inclined with an observer's front visual line is commercially available. The light modulation device of the present application can also be effectively applied to the above-described eyewear.

When the light modulation device of the present application is applied to eyewear, the structure of the eyewear is not particularly limited. That is, the light modulation device may be mounted and applied in a lens for a left eye and/or a right eye having a known eyewear structure.

For example, the eyewear may comprise a left eye lens and a right eye lens; and a frame for supporting the left eye lens and the right eye lens.

FIG. 7 is an exemplary schematic diagram of the eyewear, which is a schematic diagram of the eyewear comprising the frame (82), and left eye and right eye lenses (84), but the structure of the eyewear to which the light modulation device of the present application can be applied is not limited to FIG. 7.

In the eyewear, the left eye lens and the right eye lens may each comprise the light modulation device. Such a lens may comprise only the light modulation device, or may also comprise other configurations.

Other configurations and designs of the eyewear are not particularly limited, and known methods can be applied.

Advantageous Effects

The present application can provide a light modulation device both excellent mechanical properties and optical properties by applying an optically and mechanically anisotropic polymer film as a substrate.

BRIEF DESCRIPTION OF DRAWINGS

FIGS. 1 to 4 are schematic diagrams of exemplary light modulation devices of the present application.

FIG. 5 shows light axes of the first and second light modulation layers in a horizontal orientation state.

FIG. 6 shows pretilt directions of the first to fourth vertical alignment films.

FIG. 7 illustratively shows eyewear.

FIGS. 8 and 9 show durability evaluation results for Examples and Comparative Examples.

FIGS. 10 to 12 are the results of observing appearances of light modulation devices of Examples.

MODE FOR INVENTION

Hereinafter, the present application will be specifically described by way of Examples, but the scope of the present application is not limited by the following examples.

The polymer film substrates used in Examples or Comparative Examples are a PC (polycarbonate) film substrate (PC substrate, thickness: 100 μm, manufacturer: Teijin, product name: PFC100-D150), which is an isotropic film substrate usually applied as a substrate, and a PET (polyethylene terephthalate) film substrate (SRF substrate, thickness: 80 μm, manufacturer: Toyobo, product name: TA044), which is an asymmetric substrate according to the present application, and the following physical properties are the results of measurement in a state where an ITO (indium tin oxide) film having a thickness of about 20 nm is formed on one side of each film substrate.

1. Phase Retardation Evaluation of Polymer Film Substrate

The in-plane retardation value (Rin) of the polymer film substrate was measured for light having a wavelength of 550 nm using a UV/VIS spectroscope 8453 instrument from Agilent Co., Ltd. according to the following method. Two sheets of polarizers were installed in the UV/VIS spectroscope so that their transmission axes were orthogonal to each other, and a polymer film was installed between the two sheets of polarizers so that its slow axis formed 45 degrees with the transmission axes of the two polarizers, respectively, and then the transmittance according to wavelengths was measured. The phase retardation order of each peak is obtained from the transmittance graph according to wavelengths. Specifically, a waveform in the transmittance graph according to wavelengths satisfies Equation A below, and the maximum peak (Tmax) condition in the sine waveform satisfies Equation B below. In the case of λmax in Equation A, since the T of Equation A and the T of Equation B are the same, the equations are expanded. As the equations are also expanded for n+1, n+2 and n+3, arranged for n and n+1 equations to eliminate R, and arranged for n into λn and λn+1 equations, the following Equation C is derived. Since n and λ can be known based on the fact that T of Equation A and T of Equation B are the same, R for each of λn, λn+1, λn+2 and λn+3 is obtained. A linear trend line of R values according to wavelengths for 4 points is obtained and the R value for the equation 550 nm is calculated. The function of the linear trend line is Y=ax+b, where a and b are constants. The Y value when 550 nm has been substituted for x of the function is the Rin value for light having a wavelength of 550 nm.

$$T=\sin^2[(2\pi R/\lambda)] \quad \text{[Equation A]}$$

$$T=\sin^2[((2n+1)\pi/2)] \quad \text{[Equation B]}$$

$$n=(\lambda n-3\lambda n+1)/(2\lambda n+1+1-2\lambda n) \quad \text{[Equation C]}$$

In the above, R denotes in-plane retardation (Rin), λ denotes a wavelength, and n denotes a nodal degree of a sine waveform.

2. Evaluation of Tensile Property and Coefficient of Thermal Expansion of Polymer Film Substrate A tensile strength test was conducted according to the standard by applying a force at a tensile speed of 10 mm/min at room temperature (25° C.) using UTM (Universal Testing Machine) equipment (Instron 3342) to measure the elastic modulus (Young's modulus), elongation and maximum stress of the polymer film substrate. In this case, each specimen was prepared by tailoring it to have a width of about 10 mm and a length of about 30 mm, and both ends in the longitudinal direction were each taped by 10 mm and fixed to the equipment, and then the evaluation was performed.

A length expansion test was conducted according to the standard while elevating the temperature from 40° C. to 80° C. at a rate of 10° C./min using TMA (thermomechanical analysis) equipment (Metteler toledo, SDTA840) to measure the coefficient of thermal expansion. Upon the measurement, the measurement direction length of the specimen was set to 10 mm and the load was set to 0.02 N.

The evaluation results of physical properties of each film substrate measured in the above manner are shown in Table 1 below.

In Table 1 below, MD and TD are MD (machine direction) and TD (transverse direction) directions of the PC substrate and the SRF substrate which are stretched films, respectively, and 45 is the direction forming 45 degrees with both the MD and TD directions.

TABLE 1

| | Direction | Rin (nm) | Elastic modulus (GPa) | Elongation (%) | Maximum Stress (MPa) | Coefficient of Thermal Expansion (ppm/° C.) |
|---|---|---|---|---|---|---|
| PC | MD | 12.1 | 1.6 | 13.6 | 63.4 | 119.19 |
| Substrate | TD | | 1.6 | 11.6 | 62.3 | 127.8 |
| SRF | MD | 14800 | 2.5 | 6.1 | 81.5 | 83.3 |
| Substrate | 45 | 15176 | 3.2 | 60.4 | 101.6 | 52.2 |
| | TD | 15049 | 5.8 | 44.7 | 184.6 | 21.6 |

Example 1

Two SRF substrates were used to manufacture a light modulation device. An alignment film was formed on an ITO (indium tin oxide) film (electrode layer) of the SRF substrate (width: 15 cm, length: 5 cm) to prepare a first substrate. As the alignment film, one obtained by rubbing a polyimide-based horizontal alignment film (SE-7492, Nissan) having a thickness of 300 nm with a rubbing cloth was used. A second substrate was prepared in the same manner as the first substrate. The first and second substrates were disposed opposite to each other so that their alignment films faced each other, a composition in which a chiral dopant (S811, Merck) was formulated in a concentration of about 0.519 wt % to a GHLC mixture (MDA-16-1235, Merck) comprising a liquid crystal compound having a positive dielectric constant anisotropy with a refractive index anisotropy (ΔN) of 0.13 and a dichroic dye was positioned therebetween, and then the frame was sealed to prepare a light modulation film layer. Here, the TD directions (slow axis directions) of the first and second substrates were each 0 degrees based on the rubbing axis of the first substrate alignment film, and the rubbing directions of the first and second alignment films were 90 degrees to each other. The obtained light modulation layer was an STN mode liquid crystal layer having a twisted angle of about 270 degrees, and the cell gap was 12 μm. The light modulation film layer is a device having a linear light transmittance of about 28.0% upon no voltage application and a linear light transmittance of about 62.7% upon applying a voltage of about 15V, which can switch between the transmission and blocking modes. Here, the transmittance is a transmittance for light with a wavelength of about 550 nm as a transmittance using NDH5000SP (manufactured by Secos) equipment.

Comparative Example 1

A light modulation device was manufactured in the same manner as in Example 1, except that a PC substrate was applied as a substrate.

Test Example 1

Using the light modulation devices of Example 1 and Comparative Example 1, an eyewear element of the type shown in FIGS. 8 and 9 was manufactured, and a heat shock test was conducted in a state of bending the element. The heat shock test was performed by setting a step of raising the temperature of the eyewear from about −40° C. to 90° C. at a temperature increase rate of about 16.25° C./min and then maintaining it for 10 minutes, and again reducing the temperature from 90° C. to −40° C. at a temperature decrease rate of about 16.25° C./min and then maintaining it for 10 minutes as one cycle and repeating the cycle 500 times, where this test was conducted with the eyewear attached to a bending jig having a curvature radius of about 100R. FIG. 8 showed the case of Example 1 and FIG. 9 showed the case of Comparative Example 1, where in the case of Comparative Example 1, severe cracks were observed as in the drawing.

Comparative Example 2

A light modulation film layer was manufactured in the same manner as in Example 1, except that the first directions (TD directions) of the first and second substrates were set to 90 degrees to each other. At this time, based on the rubbing direction of the alignment film on the first substrate, the first direction of the first substrate was 0 degrees and the first direction of the second substrate was 90 degrees.

Comparative Example 3

A light modulation film layer was manufactured in the same manner as in Example 1, except that the first directions (TD directions) of the first and second substrates were set to 90 degrees to each other. At this time, based on the rubbing direction of the alignment film on the first substrate, the first direction of the first substrate was 45 degrees and the first direction of the second substrate was 135 degrees.

Test Example 2

The void generation was evaluated while the devices of Example 1, Comparative Examples 2 and 3 were each stored at 60° C. and 85% relative humidity, and the results were shown in Table 2 below. Specifically, it was evaluated whether or not the visually observed voids occurred in the light modulation layer while being kept under the above conditions. Generally, the size of the visually observed voids is about 10 μm.

TABLE 2

| | | Number of samples initially introduced | Number of bad void samples | Number of good void samples | Void incidence | First occurrence time of void |
|---|---|---|---|---|---|---|
| Comparative | 2 | 12 | 12 | 0 | 100% | 120 h |
| | 3 | 12 | 12 | 0 | 100% | 144 h |
| Example 1 | | 12 | 1 | 11 | 8% | 504 h |

As results of Table 2, in the case of Comparative Examples 2 and 3, voids were observed within 500 hours in all of the initially introduced samples to show the void incidence of 100%, and the times when the voids were first observed were also within 120 hours and 144 hours, respectively.

On the other hand, in the case of Example 1, voids were not observed within 500 hours, and the time when the voids were first observed was also about 504 hours.

Example 2

Figures 1, 2, 3, 4:
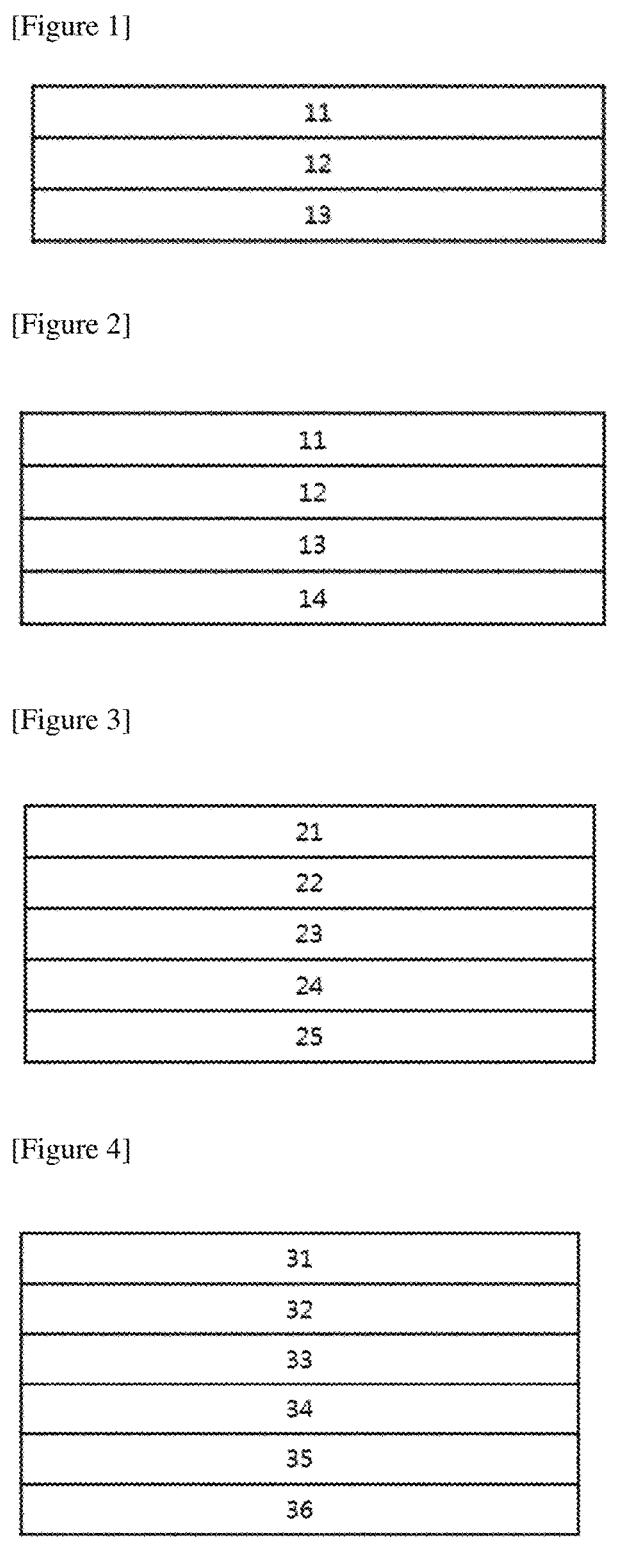

A light modulation device having the structure of FIG. 4 was produced. As the first to fourth polymer film substrates (31, 33, 34, 36), the SRF substrate was used. A vertical alignment film (PVM-11 polyimide layer from HANCHEM, Co. Ltd.) was formed on the ITO film of the SRF substrate, and a guest host liquid crystal layer comprising liquid crystals and dichroic dyes was prepared as the light modulation layer, where HNG730200 (ne: 1.551, no: 1.476, ε//: 9.6, ε⊥: 9.6, TNI:100, Δn: 0.075, Δε: −5.7) from HCCH was prepared as the liquid crystal and X12 from BASF was prepared as the dichroic dye.

The vertical alignment film was coated on the ITO layer of the polymer film substrate by bar coating and then baked at 120° C. for 1 hour to obtain an alignment film having a thickness of 300 nm. The alignment film was rubbed with a rubbing cloth to produce a first polymer film substrate. Subsequently, column spacers having a height of 10 μm and a diameter of 15 μm were arranged at intervals of 250 μm on the ITO layer of the same polymer film substrate as above, and a vertical alignment film was coated on the ITO film by bar coating and rubbed to produce a second polymer film substrate. 28 mg of the dichroic dye was dissolved in 2 g of the liquid crystal, and the suspension was removed with a syringe filter made of 0.2 μm PP (polypropylene). A sealant was drawn on the edge of the alignment film surface of the second polymer film substrate with a seal dispenser. After the liquid crystal-dye mixed liquid was sprayed on the alignment film of the second polymer film substrate, a first light modulation layer was formed and the first polymer film substrate was covered and laminated to produce a first light modulation layer. At this time, the lamination was subjected so that the first directions (TD directions, slow axis directions) of the first and second substrates were parallel to each other and the rubbing directions of the alignment films of the first substrate and the second substrate were 180 degrees to each other. The third polymer film substrate (34), the fourth polymer film substrate (36) and the second light modulation layer (35) of FIG. 4 were formed in the same manner to produce a second light modulation film layer. Subsequently, the light modulation device of Example 2 was produced by attaching the first light modulation film layer and the second light modulation film layer so that the rubbing directions of their alignment films were orthogonal to each other at 90 degrees.

The thickness (cell gap) of each of the first and second light modulation layers (32, 35) is 12 μm. In the produced light modulation device, when the direction (TD direction, slow axis direction) of the first substrate is 0 degrees, the first directions (TD directions, slow axis directions) of the second to fourth substrates are also 0 degrees, the light axis of the first light modulation layer upon horizontal orientation is 0 degrees, and the light axis of the second light modulation layer upon horizontal orientation is 90 degrees.

Example 3

A light modulation device was produced in the same manner as in Example 1, except that the substrates were disposed so that in Example 2, the first directions (TD directions, slow axis directions) of the second and third substrates were 90 degrees when the first direction (TD direction, slow axis direction) of the first substrate was 0 degrees.

Example 4

A light modulation device was produced in the same manner as in Example 1, except that in Example 2, the light axis of the first light modulation layer upon horizontal orientation was changed to be +45 degrees and the light axis of the second light modulation layer upon horizontal orientation was changed to be −45 degrees.

Test Example 3

For the devices of Examples 2 to 4, rainbow characteristics at the front (tilt angle of 0 degrees) and viewing angle (tilt angle of −23 degrees), and electro-optical characteristics were evaluated, and the results were shown in the drawings and the following Table 3.

FIGS. 10 to 11 are each the results of observing the rainbow characteristics at the tilt angles for Examples 2 to 4, and even when a plurality of light modulation film layers were overlapped as shown in the drawing, optical defects such as a rainbow phenomenon did not occur.

The electro-optical characteristics were evaluated by placing the light modulation device on the backlight after connecting the electrode layers of the first and third polymer film substrates among the electrode layers of the first to fourth polymer film substrates of the light modulation device to one terminal and connecting the electrode layers of the second and third polymer film substrates to one terminal, connecting the two electrode terminals to the terminals of the function generator, and measuring luminance values with photodiode while applying the voltage from 0 Vrms to 28 Vrms to measure the transmittance. The initial luminance value of the backlight was measured and converted to a percentage to record the transmittance value.

The contrast ratio (CR) is a ratio (Tc/T) of the transmittance (Tc) in a state of no voltage application to the transmittance (T) upon applying a voltage of 28V. dC* is a color difference for values of color coordinates a' and b' when measuring an actual sample based on color coordinates (a, b)=(0, 0) of the D65 light source upon using Lab color coordinates, and means a color difference index converted by Equation SQRT (a'^+b'^2).

TABLE 3

| | Example 1 | Example 2 | Example 3 |
|---|---|---|---|
| Rainbow | No | No | No |
| Transmittance (0 V) | 44.4% | 44.3% | 45.6% |
| Transmittance (28 V) | 2.42% | 2.17% | 12.44% |
| CR | 19.3:1 | 20.4:1 | 3.7:1 |
| dC* | 13.8 | 14.3 | 8.3 |

The invention claimed is:

1. A light modulation device, comprising:
a light modulation film layer,
wherein the light modulation film layer comprises:
a first polymer film substrate having a first electrode layer disposed directly thereon;
a second polymer film substrate having a second electrode layer disposed directly thereon; and
a light modulation layer between the first polymer film substrate and the second polymer film substrate,
wherein the first and second polymer film substrates are disposed such that the first and second electrode layers face each other,
wherein each of the first polymer film substrate and the second polymer film substrate has an in-plane retardation of 4,000 nm or more for light having a wavelength of 550 nm,
wherein each of the first and second polymer film substrates are stretched films, wherein the stretched films have a machine direction and a transverse direction, wherein the machine direction is perpendicular to the transverse direction,
wherein the machine direction and the transverse direction are in-plane directions,
and
wherein the first polymer film substrate and the second polymer film substrate are disposed so that an angle formed by the transverse direction of the first polymer film substrate and the transverse direction of the second polymer film substrate is in a range of 0 degrees to 10 degrees.

2. The light modulation device according to claim 1, wherein the first polymer film substrate and second polymer film substrate are polyester film substrates.

3. The light modulation device according to claim 1, wherein each of the first polymer film substrate and the second polymer film substrate has a ratio (CTE2/CTE1) of a coefficient of thermal expansion (CTE2) in the machine direction to a coefficient of thermal expansion (CTE1) in the transverse direction of 1.5 or more.

4. The light modulation device according to claim 3, wherein CTE2 is in a range of 5 to 150 ppm/° C.

5. The light modulation device according to claim 1, wherein each of the first polymer film substrate and the second polymer film substrate has a ratio (YM1/YM2) of an elastic modulus (YM1) in the transverse direction to an elastic modulus (YM2) in the machine direction of 1.5 or more.

6. The light modulation device according to claim 5, wherein YM1 is in a range of 4 to 10 GPa.

7. The light modulation device according to claim 1, wherein each of the first polymer film substrate and second polymer film substrate has a ratio (MS1/MS2) of a maximum stress (MS1) in the transverse direction to a maximum stress (MS2) in the machine direction of 1.5 or more.

8. The light modulation device according to claim 7, wherein MS1 is in a range of 150 to 250 MPa.

9. The light modulation device according to claim 1, further comprising a polarizer disposed on at least one side of the light modulation film layer.

10. The light modulation device according to claim 9, wherein an angle formed by a transmission axis of the polarizer and the transverse direction of the first polymer film substrate and the second polymer film substrate is in a range of 0 degrees to 10 degrees.

11. The light modulation device according to claim 9, wherein an angle formed by a transmission axis of the polarizer and the transverse direction of the first polymer film substrate and the second polymer film substrate is in a range of 80 degrees to 100 degrees.

12. The light modulation device according to claim 1, comprising two light modulation film layers, wherein an angle formed by the transverse directions of all of the first polymer film substrate and the second polymer film substrate included in each of the light modulation film layers is in a range of 0 degrees to 10 degrees.

13. The light modulation device according to claim 1, wherein the light modulation layer is a liquid crystal layer, an electrochromic material layer, a photochromic material layer, an electrophoretic material layer, a dispersed particle orientation layer or a guest host liquid crystal layer.

14. An eyewear comprising a left eye lens, a right eye lens, and a frame for supporting the left eye lens and the right eye lens, wherein each of the left eye lens and the right eye lens comprises the light modulation device of claim 1.

15. The light modulation device according to claim 1, wherein the first and second polymer film substrates are stretched in the transverse direction to an elongation (E1) and stretched in the machine direction to an elongation (E2), wherein a ratio of E1 to E2 is 3 or more.

16. The light modulation device according to claim 15, wherein E1 in each of the first and second polymer film substrates is 15% or more.

17. The light modulation device according to claim 15, wherein each of the first polymer film substrate and the second polymer film substrate have an elongation (E3) in a third direction, wherein an angle formed between the third direction and both the machine and transverse directions is within a range of 40 degrees to 50 degrees, wherein the third direction is an in-plane direction, wherein E3 is larger than E1, and wherein a ratio of E3 to E2 is 5 or more.

* * * * *